United States Patent
Hirzallah et al.

(10) Patent No.: US 11,843,993 B2
(45) Date of Patent: Dec. 12, 2023

(54) BEAM-BASED MACHINE LEARNING-ENABLED RFFP POSITIONING

(71) Applicant: QUALCOMM Incorporated, San Diego, CA (US)

(72) Inventors: Mohammed Ali Mohammed Hirzallah, San Diego, CA (US); Srinivas Yerramalli, San Diego, CA (US); Taesang Yoo, San Diego, CA (US); Rajat Prakash, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 17/457,718

(22) Filed: Dec. 6, 2021

(65) Prior Publication Data
US 2023/0179953 A1    Jun. 8, 2023

(51) Int. Cl.
*H04W 4/029*    (2018.01)
*H04B 7/06*    (2006.01)
*H04B 17/318*    (2015.01)

(52) U.S. Cl.
CPC .......... *H04W 4/029* (2018.02); *H04B 7/0617* (2013.01); *H04B 17/318* (2015.01)

(58) Field of Classification Search
CPC .... H04W 4/029; H04B 17/318; H04B 7/0617
USPC ...................................... 455/456.2
See application file for complete search history.

(56) References Cited

U.S. PATENT DOCUMENTS

| 2014/0018095 A1* | 1/2014 | Parvizi | H04W 4/025 455/456.1 |
| 2015/0024773 A1 | 1/2015 | Li et al. | |
| 2021/0149011 A1* | 5/2021 | Wetzker | G01S 5/0252 |

FOREIGN PATENT DOCUMENTS

CA    2442950 A1    3/2005

OTHER PUBLICATIONS

CMCC: "Discussion on Location Information Enhancement for MDT", 3GPP TSG-RAN WG2 Meeting #75bis, R2-115253, 3rd Generation Partnership Project, Mobile Competence Centre, 650, Route Des Lucioles, F-06921 Sophia-antipolis Cedex, France, vol. RAN WG2, No. Zhuhai, Oct. 10, 2011, Oct. 3, 2011, 3 Pages, XP050540835, Figure 1, pp. 1-2, Section 2.1.

(Continued)

*Primary Examiner* — Ted M Wang
(74) *Attorney, Agent, or Firm* — QUALCOMM Incorporated

(57) ABSTRACT

Aspects presented herein may enable an ML module to associate RF fingerprints with beam directions and/or beam features to improve the uniqueness of RF fingerprints. In one aspect, network entity may receive, from one or more wireless devices, a plurality of first RF fingerprints, each of the plurality of first RF fingerprints being associated with at least one directional feature and a location. The network entity may receive a request to determine a position of a UE based on at least one second RF fingerprint associated with the UE or captured by the UE. The network entity may estimate the position of the UE based at least in part on matching the at least one second RF fingerprint to at least one of the plurality of first RF fingerprints.

27 Claims, 25 Drawing Sheets

(56) References Cited

OTHER PUBLICATIONS

ERICSSON: "On RFPM Scenarios", 3GPP TSG-RAN WG4 Meeting #62bis, R4-121775, 3rd Generation Partnership Project, Mobile Competence Centre, 650, Route Des Lucioles, F-06921 Sophia-antipolis Cedex, France, vol. RAN WG4, No. Jeju Island, Korea, Mar. 26, 2012-Mar. 30, 2012, Mar. 19, 2012, 6 Pages, XP050613118, p. 1, Section 2.

Fischer S., "Chapter 15: 5G NR Positioning: Fundamentals and Standards", 5G and Beyond: Fundamentals and Standards, Jan. 1, 2021, Springer International Publishing, Cham, XP055847961, pp. 429-483, ISBN: 978-3-030-58197-8, DOI: 10.1007/978-3-030-58197-8_15, p. 464, 1st Para to p. 467, 3rd Para, 0003-03.1, 03.3, p. 449-451, Sec. Received Signal Strength, p. 451-452, Angle of Arrival, p. 461-462, Downlink Angle-of-Departure Positioning.

International Search Report and Written Opinion—PCT/US2022/045810—ISA/EPO—dated Jan. 26, 2023.

Rocamora J.M., et al., "Survey of CSI Fingerprinting-based Indoor Positioning and Mobility Tracking Systems", IET Signal Processing, Michael Faraday House, Six Hills Way, Stevenage, Herts. SG1 2AY, UK, vol. 14, No. 7, Sep. 1, 2020, pp. 407-419, XP006092109, ISSN: 1751-9675, DOI:10.1049/IET-SPR.2020.0028, p. 408, col. 1, Fig. 2, col. 2, line 24—p. 409, col. 1, line 2, col. 1, lines 40-51, p. 411, col. 1, lines 1-10, p. 419, col. 1, lines 1-15 of sec. 5.1.

\* cited by examiner

FIG. 17
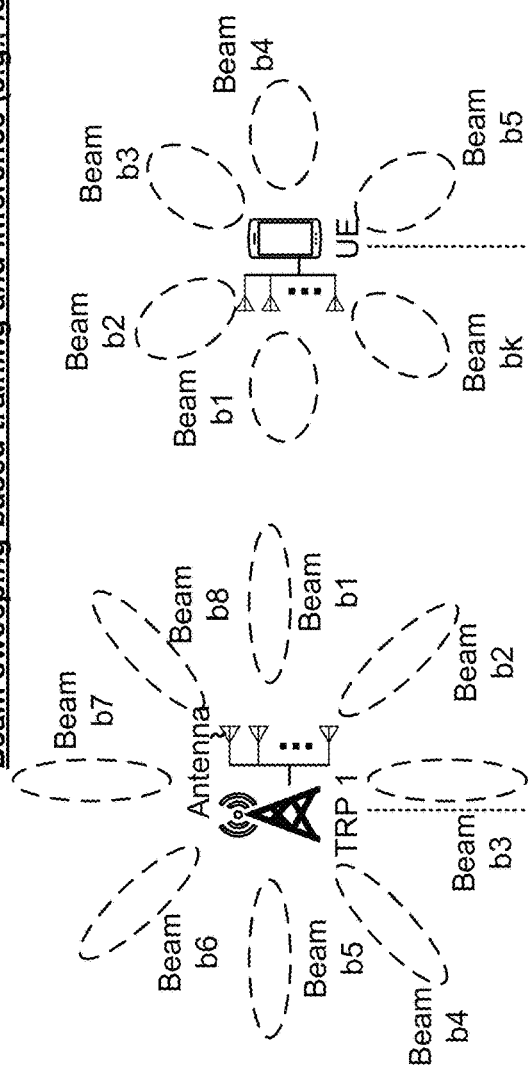
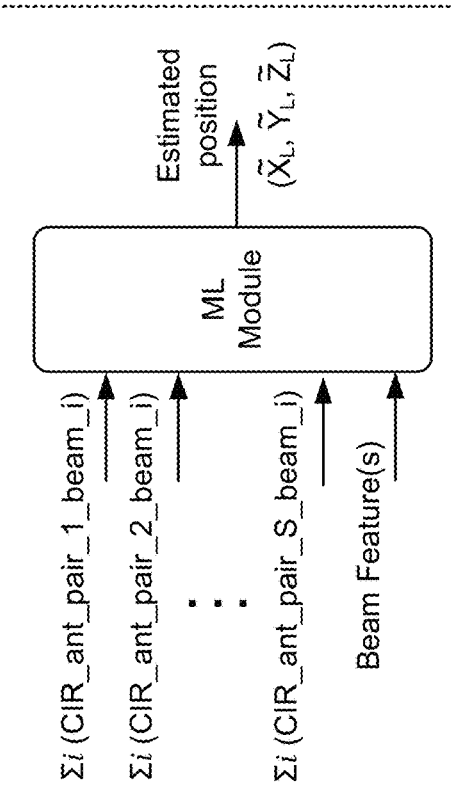
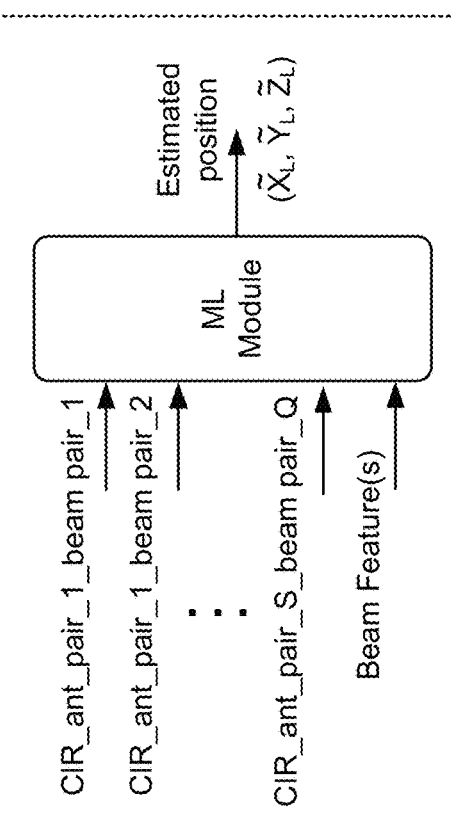

BEAM-BASED MACHINE LEARNING-ENABLED RFFP POSITIONING

TECHNICAL FIELD

The present disclosure relates generally to communication systems, and more particularly, to wireless communications involving positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some communication systems may also support a number of cellular network-based positioning technologies, where the geographic location of a wireless device may be determined based on measuring radio signals exchanged between the wireless device and other wireless devices. For example, a distance between a wireless device and a transmission reception point (TRP) may be estimated based on the time it takes for a reference signal (e.g., a positioning reference signal (PRS)) transmitted from the TRP to reach the wireless device. Other examples of cellular network-based positioning technologies may include downlink-based, uplink-based, and/or downlink-and-uplink-based positioning methods.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives, from one or more wireless devices, a plurality of first radio frequency (RF) fingerprints, each of the plurality of first RF fingerprints being associated with at least one directional feature and a location. The apparatus receives a request to determine a position of a user equipment (UE) based on at least one second RF fingerprint associated with the UE or captured by the UE. The apparatus estimates the position of the UE based at least in part on matching the at least one second RF fingerprint to at least one of the plurality of first RF fingerprints.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 17 is a diagram illustrating an example of an ML module training and inference based on beam sweeping in accordance with various aspects of the present disclosure. In another aspect of the present disclosure.

DETAILED DESCRIPTION

Figure 1:
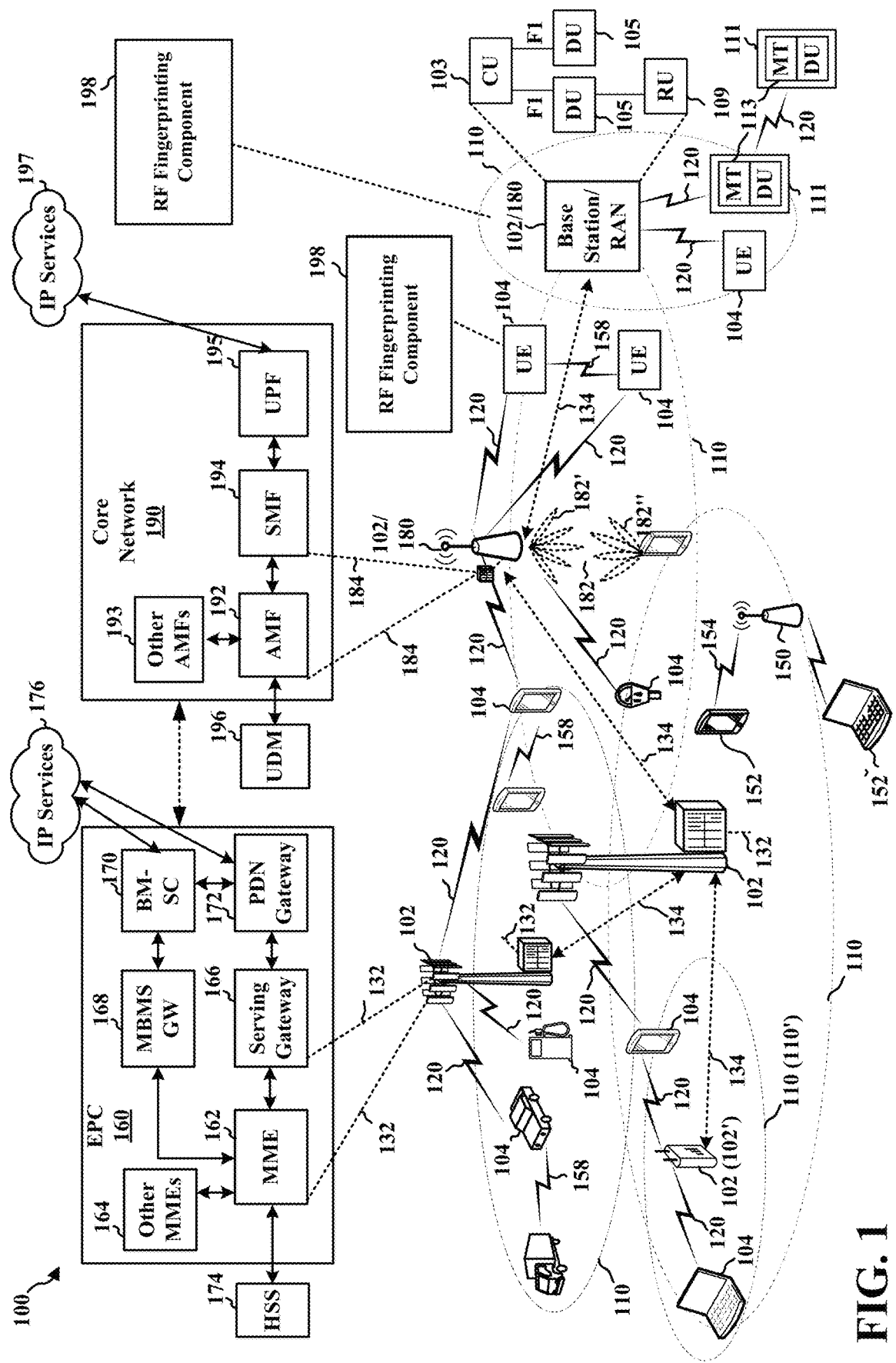
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented herein may improve accuracy of RFFP-based positioning by associating RF fingerprints with beam directions and/or beam features to improve the uniqueness of RF fingerprints. Aspects presented herein may enable an ML module to map a directional RF fingerprint and/or beam feature inputs to device position as an output, where the direction RF fingerprint may include RF captured between pair(s) of antennas (e.g., at least one antenna of a transmitter and at least one antenna of a receiver). For purposes of the present disclosure, an RF fingerprint that includes a feature associated with a transmitting beam and/or a receiving beam may be referred to as a direction RF fingerprint or an RF fingerprint with a directional feature. For example, a directional RF fingerprint may be CIR captured at one or more antenna pairs (which may also be called beam pairs), CFR captured at one or more antenna pairs, and/or a normalized histogram of received signal strength measured over a period and/or range in frequency captured at one or more antenna pairs, etc.

In certain aspects, the UE 104 and/or a base station 102/180, may include an RF fingerprinting component 198 configured to associate RF fingerprints with beam directions and/or beam features. In one configuration, the RF fingerprinting component 198 may be configured to receive, from one or more wireless devices, a plurality of first RF fingerprints, each of the plurality of first RF fingerprints being associated with at least one directional feature and a location. In such configuration, the RF fingerprinting component 198 may receive a request to determine a position of a UE based on at least one second RF fingerprint associated with the UE or captured by the UE. In such configuration, the RF fingerprinting component 198 may estimate the position of the UE based at least in part on matching the at least one second RF fingerprint to at least one of the plurality of first RF fingerprints.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a base station 102 or 180 may be referred as a RAN and may include aggregated or disaggregated components. As an example of a disaggregated RAN, a base station may include a central unit (CU) 103, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 103, the DU 105, and the RU 109. A RAN may be disaggregated with a split between the CU 103 and an aggregated DU/RU. The CU 103 and the one or more DUs 105 may be connected via an F1 interface. A DU 105 and an RU 109 may be connected via a fronthaul interface. A connection between the CU 103 and a DU 105 may be referred to as a midhaul, and a connection between a DU 105 and an RU 109 may be referred to as a fronthaul. The connection between the CU 103 and the core network may be referred to as the backhaul. The RAN may be based on a functional split between various components of the RAN, e.g., between the CU 103, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 103 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111.

The IAB donor may include a CU 103 and a DU 105. IAB nodes 111 may include a DU 105 and a mobile termination (MT) 113. The DU 105 of an IAB node 111 may operate as a parent node, and the MT 113 may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2A:
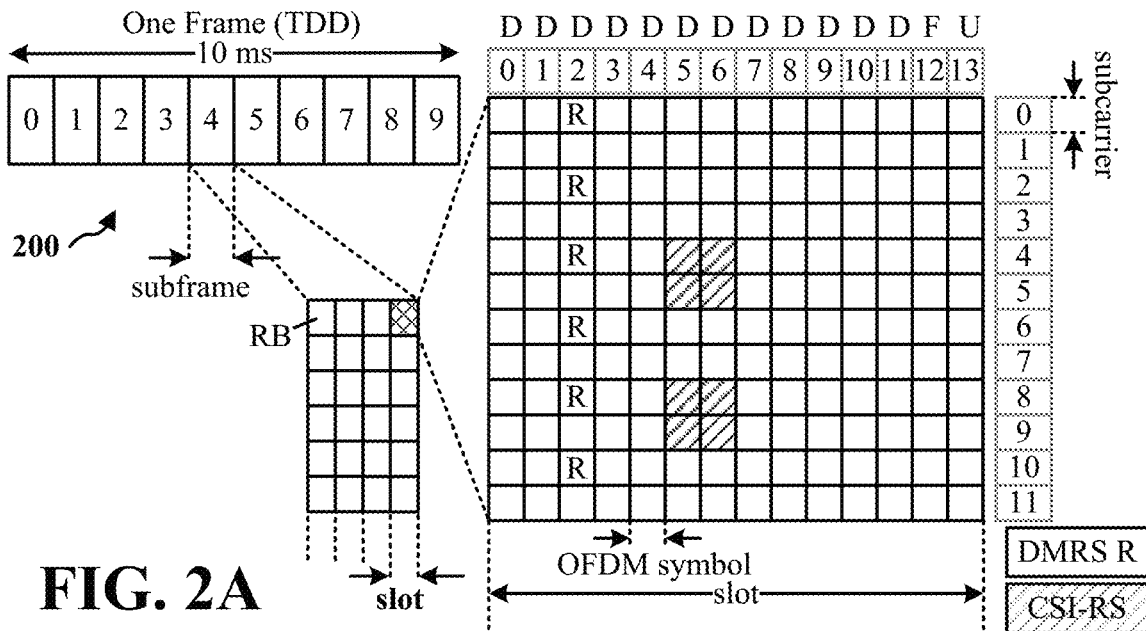
FIG. 2A is a diagram illustrating an example of a first frame, in accordance with various aspects of the present disclosure.
Figure 2B:
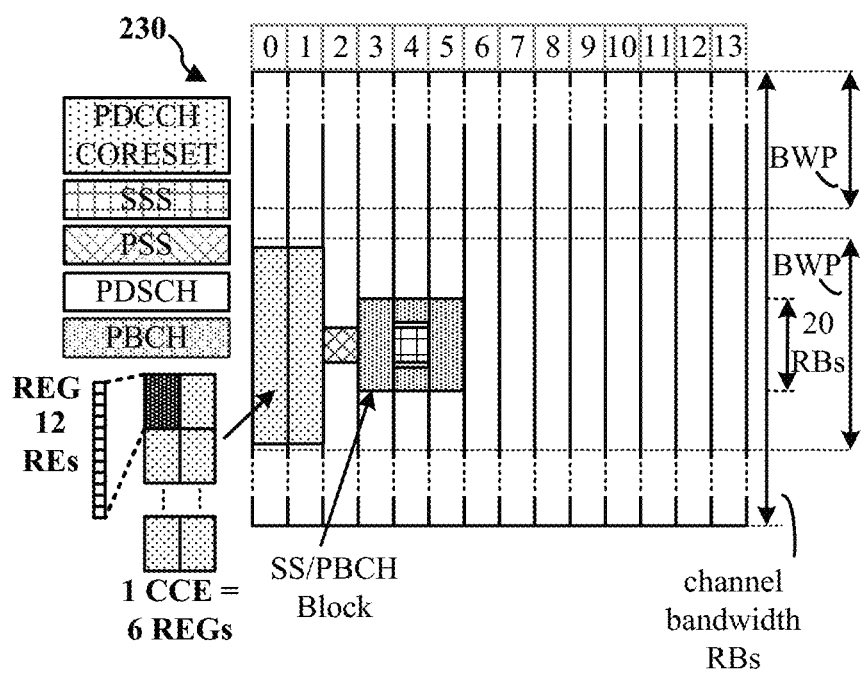
FIG. 2B is a diagram illustrating an example of DL channels within a subframe, in accordance with various aspects of the present disclosure.
Figure 2C:
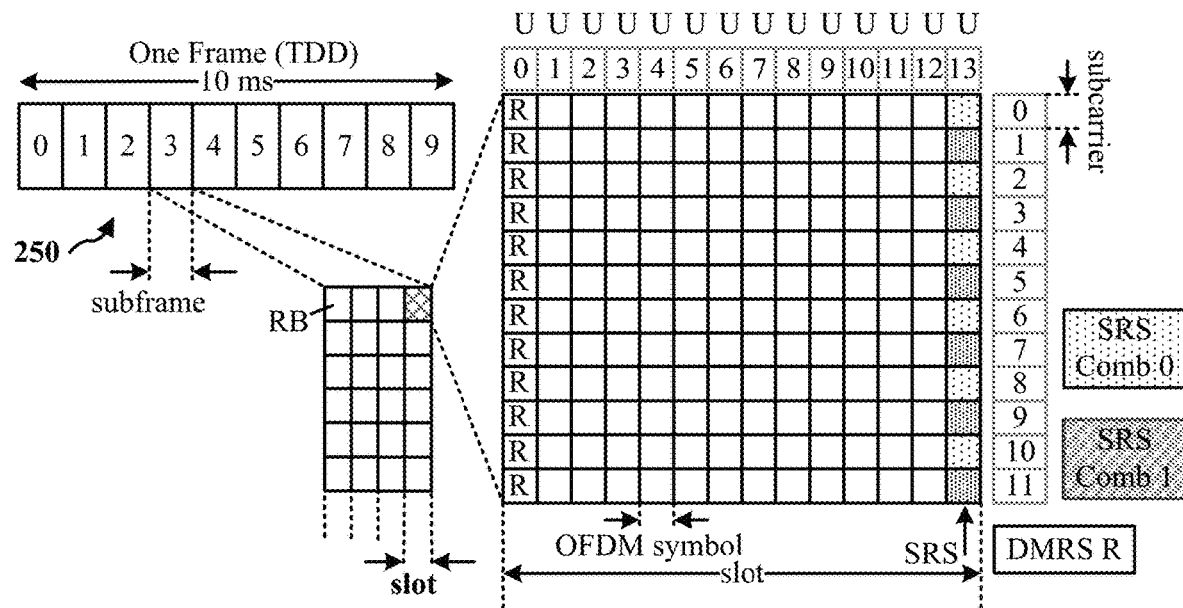
FIG. 2C is a diagram illustrating an example of a second frame, in accordance with various aspects of the present disclosure.
Figure 2D:
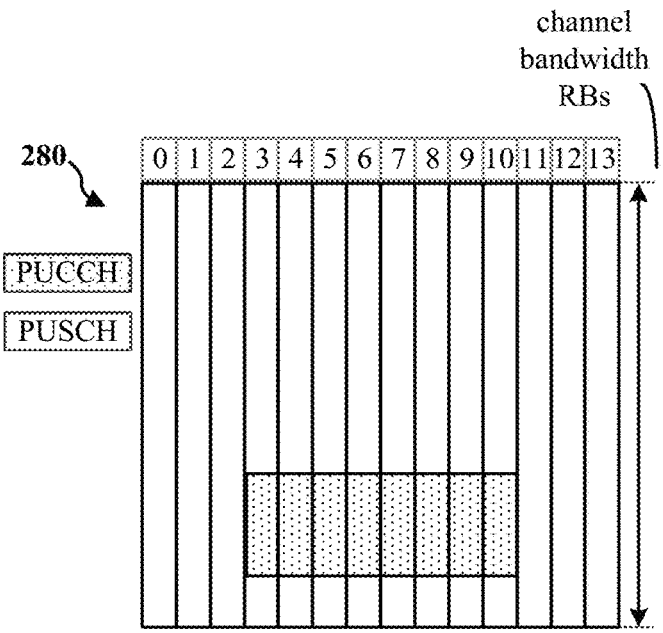
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |

| μ | SCS $\Delta f = 2^\mu \cdot 15$ [kHz] | Cyclic prefix |
|---|---|---|
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
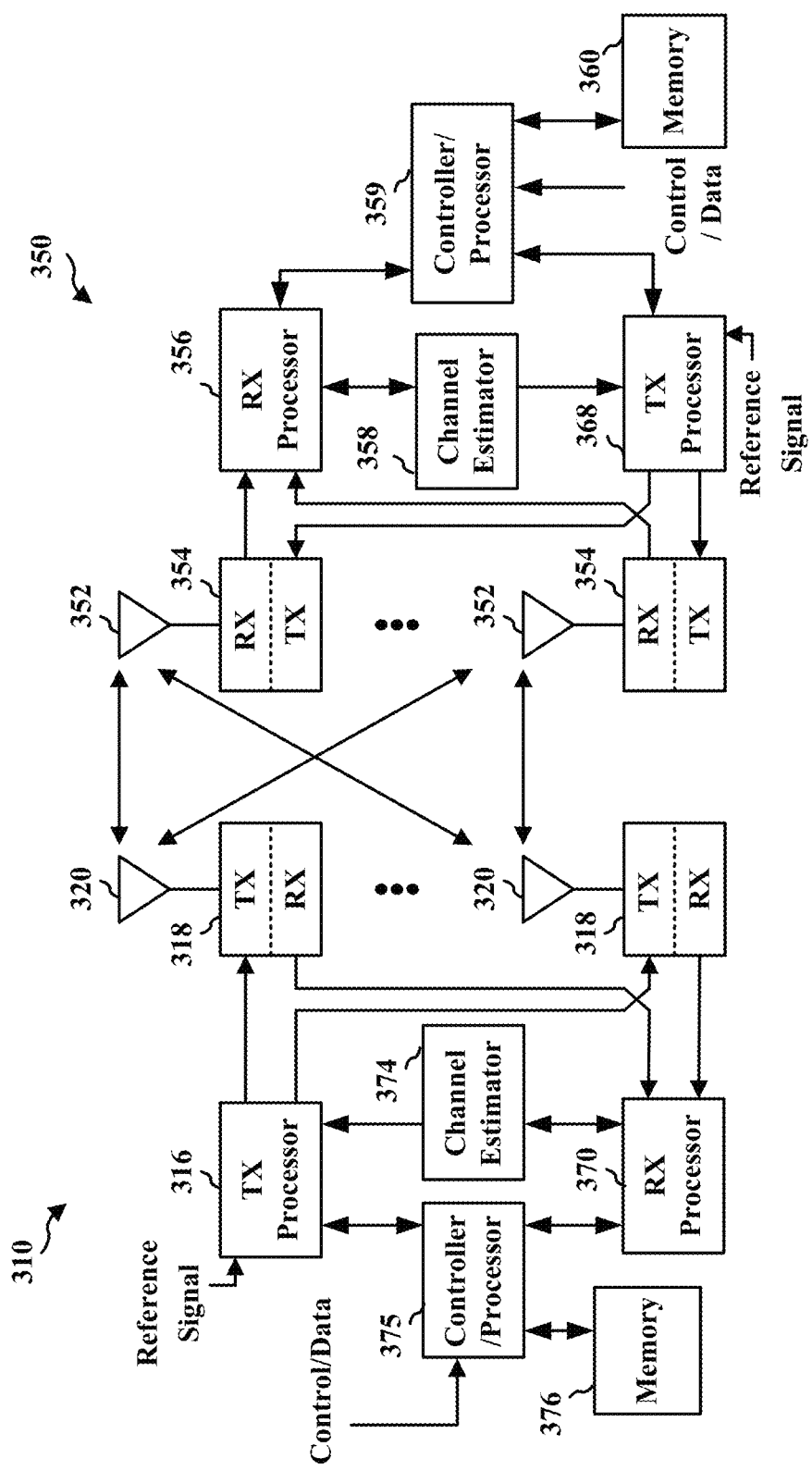
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some examples, at least one of the TX processor 368, the RX processor 356, and the controller/processor 359 may be configured to perform aspects in connection with the RF fingerprinting component 198 of FIG. 1. In other examples, at least one of the TX processor 316, the RX processor 370, and the controller/processor 375 may be configured to perform aspects in connection with the RF fingerprinting component 198 of FIG. 1.

A network may support a number of cellular network-based positioning technologies, such as downlink-based, uplink-based, and/or downlink-and-uplink-based positioning methods. Downlink-based positioning methods may include an observed time difference of arrival (OTDOA) (e.g., in LTE), a downlink time difference of arrival (DL-TDOA) (e.g., in NR), and/or a downlink angle-of-departure (DL-AoD) (e.g., in NR). In an OTDOA or DL-TDOA positioning procedure, a UE may measure the differences between each time of arrival (ToA) of reference signals (e.g., positioning reference signals (PRSs)) received from pairs of base stations, referred to as reference signal time difference (RSTD) measurements or time difference of arrival (TDOA) measurements, and report them to a positioning entity (e.g., a location management function (LMF)). For example, the UE may receive identifiers (IDs) of a reference base station (which may also be referred to as a reference cell or a reference gNB) and at least one non-reference base station in assistance data (AD). The UE may then measure the RSTD between the reference base station and each of the non-reference base stations. Based on the known locations of the involved base stations and the RSTD measurements, the positioning entity may estimate a location of the UE. In other words, a position of the UE may be estimated based on measuring reference signals transmitted between the UE and one or more base stations and/or transmission-reception points (TRPs) of the one or more base stations. As such, the PRSs may enable UEs to detect and measure neighbor TRPs, and to perform positioning based on the measurement. For purposes of the present disclosure, the suffixes "-based" and "-assisted" may refer respectively to the node that is responsible for making the positioning calculation (and which may also provide measurements) and a node that provides measurements (but which may not make the positioning calculation). For example, an operation in which measurements are provided by a UE to a base station/positioning entity to be used in the computation of a position estimate may be described as "UE-assisted," "UE-assisted positioning," and/or "UE-assisted position calculation" while an operation in which a UE computes its own position may be described as "UE-based," "UE-based positioning," and/or "UE-based position calculation."

In some examples, the term "TRP" may refer to one or more antennas of a base station whereas the term "base station" may refer to a complete unit (e.g., the base station 102/180) that includes aggregated or disaggregated components, such as described in connection with FIG. 1. For example, as an example of a disaggregated RAN, a base station may include CU, one or more DUs, one or more RUs, and/or one or more TRPs. One or more disaggregated components may be located at different locations. For example, different TRPs may be located at different geographic locations. In another example, a TRP may refer to a set of geographically co-located antennas (e.g., antenna array (with one or more antenna elements)) supporting transmission point (TP) and/or reception point (RP) functionality. Thus, a base station may transmit signal to and/or receive signal from other wireless device (e.g., a UE, another base station, etc.) via one or more TRPs. For purposes of the present disclosure, in some examples, the term "TRP" may be used interchangeably with the term "base station."

For DL-AoD positioning, the positioning entity may use a beam report from the UE of received signal strength measurements of multiple downlink transmit beams to determine the angle(s) between the UE and the transmitting base station(s). The positioning entity may then estimate the location of the UE based on the determined angle(s) and the known location(s) of the transmitting base station(s).

Uplink-based positioning methods may include UL-TDOA and UL-AoA. UL-TDOA is similar to DL-TDOA, but is based on uplink reference signals (e.g., sounding reference signals (SRSs)) transmitted by the UE. For UL-AoA positioning, one or more base stations may measure the received signal strength of one or more uplink reference signals (e.g., SRSs) received from a UE on one or more uplink receive beams. The positioning entity may use the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods may include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or a base station), which transmits an RTT response signal (e.g., an SRS or a PRS) back to the initiator. The RTT response signal may include the difference between the ToA of the RTT measurement signal and the transmission time of the RTT response signal, referred to as the reception-to-transmission (Rx-Tx) time difference. The initiator may calculate the difference between the transmission time of the RTT measurement signal and the ToA of the RTT response signal, referred to as the transmission-to-reception (Tx-Rx) time difference. The propagation time (also referred to as the "time of flight") between the initiator and the responder may be calculated from the Tx-Rx and Rx-Tx time differences. Based on the propagation time and the known speed of light, the distance between the initiator and the responder may be determined. For multi-RTT positioning, a UE may perform an RTT procedure with multiple base stations to enable its location to be determined (e.g., using multilateration) based on the known locations of the base stations. RTT and multi-RTT methods may be combined with other positioning techniques, such as UL-AoA and DL-AoD, to improve location accuracy.

The E-CID positioning method may be based on radio resource management (RRM) measurements. In E-CID, the UE may report the serving cell ID and the timing advance (TA), as well as the identifiers, estimated timing, and signal strength of detected neighbor base stations. The location of the UE is then estimated based on this information and the known locations of the base station(s).

To assist positioning operations, a location server (e.g., a location server, an LMF, or an SLP) may provide assistance data (AD) to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations (e.g., in periodically broadcasted overhead messages, etc.). In some cases, the UE may be able to detect neighbor network nodes without the use of assistance data.

In the case of an OTDOA or DL-TDOA positioning procedure, the assistance data may further include an expected RSTD value and an associated uncertainty (e.g., a search space window) around the expected RSTD. In some cases, the value range of the expected RSTD may be plus-minus (+/−) 500 microseconds (μs). In some cases, when any of the resources used for the positioning measurement are in FR1, the value range for the uncertainty of the expected RSTD may be +/−32 In other cases, when all of the resources used for the positioning measurement(s) are in FR2, the value range for the uncertainty of the expected RSTD may be +/−8 In this context, "RSTD" may refer to one or more measurements indicative of a difference in time of arrival between a PRS transmitted by a base station, referred to herein as a "neighbor base station" or a "measuring base station," and a PRS transmitted by a reference base station. A reference base station may be selected by a location server and/or by a UE to provide good or sufficient signal strength observed at a UE, such that a PRS may be more accurately and/or more quickly acquired and/or measured, such as without any special assistance from a serving base station.

A location estimate may also be referred to as a position estimate, location, position, position fix, fix, or the like. A location estimate may be geodetic and include coordinates (e.g., latitude, longitude, and possibly altitude) or may be civic and include a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence). For purposes of the present disclosure, reference signals may include PRS, tracking reference signals (TRS), phase tracking reference signals (PTRS), cell-specific reference signals (CRS), CSI-RS, demodulation reference signals (DMRS), PSS, SSS, SSBs, SRS, etc., depending on whether the illustrated frame structure is used for uplink or downlink communication. In some examples, a collection of resource elements (REs) that are used for transmission of PRS may be referred to as a "PRS resource." The collection of resource elements may span multiple PRBs in the frequency domain and one or more consecutive symbol(s) within a slot in the time domain. In a given OFDM symbol in the time domain, a PRS resource may occupy consecutive PRBs in the frequency domain. In other examples, a "PRS resource set" may refer to a set of PRS resources used for the transmission of PRS signals, where each PRS resource may have a PRS resource ID. In addition, the PRS resources in a PRS resource set may be associated with a same TRP. A PRS resource set may be identified by a PRS resource set ID and may be associated with a particular TRP (e.g., identified by a TRP ID). In addition, the PRS resources in a PRS resource set may have a same periodicity, a common muting pattern configuration, and/or a same repetition factor across slots. The periodicity may be a time from a first repetition of a first PRS resource of a first PRS instance to the same first repetition of the same first PRS resource of the next PRS instance. For example, the periodicity may have a length selected from $2^\mu*\{4, 5, 8, 10, 16, 20, 32, 40, 64, 80, 160, 320, 640, 1280, 2560, 5120, 10240\}$ slots, where $\mu=0, 1, 2, 3$. The repetition factor may have a length selected from $\{1, 2, 4, 6, 8, 16, 32\}$ slots. A PRS resource ID in a PRS resource set may be associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." In some examples, a "PRS instance" or "PRS occasion" may be one instance of a periodically repeated time window (such as a group of one or more consecutive slots) where PRS are expected to be transmitted. A PRS occasion also may be referred to as a "PRS positioning occasion," a "PRS positioning instance," a "positioning occasion," "a positioning instance," a "positioning repetition," or simply an "occasion," an "instance," and/or a "repetition," etc.

A positioning frequency layer (PFL) (which may also be referred to as a "frequency layer") may be a collection of one or more PRS resource sets across one or more TRPs that have the same values for certain parameters. Specifically, the collection of PRS resource sets may have a same subcarrier spacing and cyclic prefix (CP) type (e.g., meaning all numerologies supported for PDSCHs are also supported for PRS), the same Point A, the same value of the downlink PRS bandwidth, the same start PRB (and center frequency), and/or the same comb-size, etc. The Point A parameter may take the value of a parameter ARFCN-ValueNR (where "ARFCN" stands for "absolute radio-frequency channel number") and may be an identifier/code that specifies a pair of physical radio channel used for transmission and reception. In some examples, a downlink PRS bandwidth may have a granularity of four PRBs, with a minimum of 24 PRBs and a maximum of 272 PRBs. In other examples, up to four frequency layers may be configured, and up to two PRS resource sets may be configured per TRP per frequency layer.

The concept of a frequency layer may be similar to a component carrier (CC) and a BWP, where CCs and BWPs may be used by one base station (or a macro cell base station and a small cell base station) to transmit data channels, while frequency layers may be used by multiple (e.g., three or more) base stations to transmit PRS. A UE may indicate the number of frequency layers it is capable of supporting when the UE sends the network its positioning capabilities, such as during a positioning protocol session. For example, a UE may indicate whether it is capable of supporting one or four PFLs.

Figure 4:
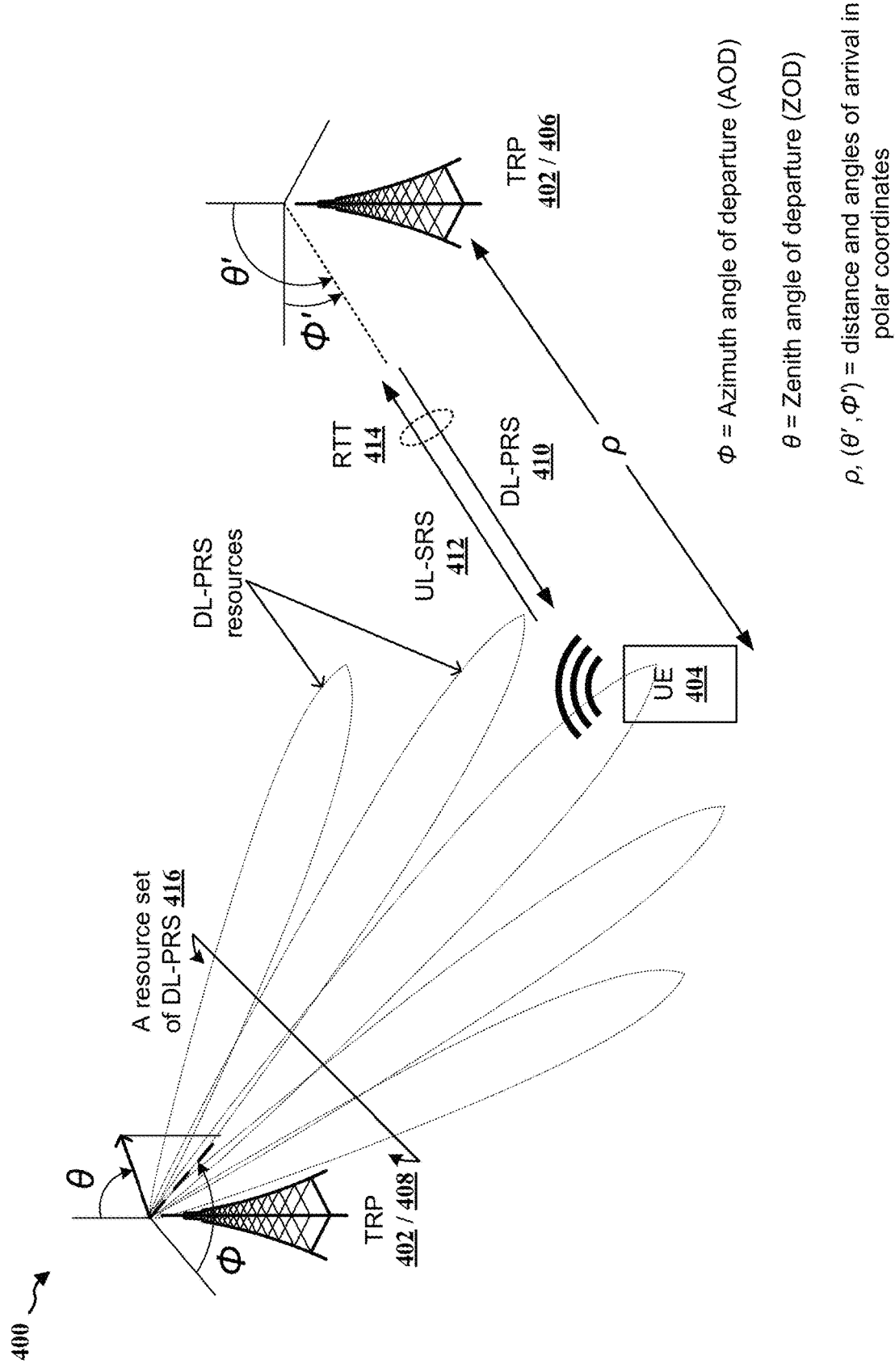
FIG. 4 is a diagram illustrating an example of a UE positioning based on reference signal measurements in accordance with various aspects of the present disclosure.

FIG. 4 is a diagram 400 illustrating an example of a UE positioning based on reference signal measurements in accordance with various aspects of the present disclosure. In one example, a location of UE 404 may be estimated based on multi-cell round trip time (multi-RTT) measurements, where multiple TRPs 402 may perform round trip time (RTT) measurements for signals transmitted to and received from the UE 404 to determine the approximate distance of UE 404 with respect to each of the multiple TRPs 402. Similarly, the UE 404 may perform RTT measurements for signals transmitted to and received from the TRPs 402 to determine the approximate distance of each TRP with respect to the UE 404. Then, based at least in part on the approximate distances of UE 404 with respect to the multiple TRPs 402, a location management function (LMF) that is associated with the TRPs 402 and/or the UE 404 may estimate the position of UE 404. For example, a TRP 406 may transmit at least one downlink positioning reference signal (DL-PRS) 410 to the UE 404, and may receive at least one uplink sounding reference signal (UL-SRS) 412 transmitted from the UE 404. Based at least in part on measuring an RTT 414 between the DL-PRS 410 transmitted and the UL-SRS 412 received, a serving base station associated with the TRP 406 or an LMF associated with the TRP 406 may identify the position of UE 404 (e.g., distance) with respect to the TRP 406. Similarly, the UE 404 may transmit UL-SRS 412 to the TRP 406, and may receive DL-PRS 410 transmitted from the TRP 406. Based at least in part on measuring the RTT 414 between the UL-SRS 412 transmitted and the DL-PRS 410 received, the UE 404 or an LMF associated with the UE 404 may identify the position of TRP 406 with respect to the UE 404. The multi-RTT measurement mechanism may be initiated by the LMF that is associated with the TRP 406/408 and/or the UE 404. A TRP may configure UL-SRS resources to a UE via radio resource control (RRC) signaling. In some examples, the UE and the TRP may report the multi-RTT measurements to the LMF, and the LMF may estimate the position of the UE based on the reported multi-RTT measurements.

In other examples, a position of a UE may be estimated based on multiple antenna beam measurements, where a downlink angle of departure (DL-AoD) and/or uplink angle of arrival (UL-AoA) of transmissions between a UE and one or more TRPs may be used to estimate the position of the UE and/or the distance of the UE with respect to each TRP. For example, referring back to FIG. 4, with regard to the DL-AoD, the UE 404 may perform reference signal received power (RSRP) measurements for a set of DL-PRS 416 transmitted from multiple transmitting beams (e.g., DL-PRS beams) of a TRP 408, and the UE 404 may provide the DL-PRS beam measurements to a serving base station (or to the LMF associated with the base station). Based on the DL-PRS beam measurements, the serving TRP or the LMF may derive the azimuth angle (e.g., Φ) of departure and the zenith angle (e.g., θ) of departure for DL-PRS beams of the TRP 408. Then, the serving TRP or the LMF may estimate the position of UE 404 with respect to the TRP 408 based on the azimuth angle of departure and the zenith angle of departure of the DL-PRS beams. Similarly, for the UL-AoA, a position of a UE may be estimated based on UL-SRS beam measurements measured at different TRPs, such as at the TRPs 402. Based on the UL-SRS beam measurements, a serving base station or an LMF associated with the serving base station may derive the azimuth angle of arrival and the zenith angle of arrival for UL-SRS beams from the UE, and the serving base station or the LMF may estimate the position of the UE and/or the UE distance with respect to each of the TRPs based on the azimuth angle of arrival and the zenith angle of arrival of the UL-SRS beams.

FIG. 5A is a diagram 500A illustrating an example of DL-PRS transmitted from multiple TRPs in accordance with various aspects of the present disclosure. In one example, a serving base station may configure DL-PRS to be transmitted from one or more TRPs within a slot or across multiple slots. If the DL-PRS is configured to be transmitted within a slot, the serving base station may configure the starting resource element in time and frequency from each of the one or more TRPs. If the DL-PRS is configured to be transmitted across multiple slots, the serving base station may configure gaps between DL-PRS slots, periodicity of the DL-PRS, and/or density of the DL-PRS within a period. The serving base station may also configure the DL-PRS to start at any physical resource block (PRB) in the system bandwidth. In one example, the system bandwidth may range from 24 to 276 PRBs in steps of 4 PRBs (e.g., 24, 28, 32, 36, etc.). The serving base station may transmit the DL-PRS in PRS beams, where a PRS beam may be referred to as a "PRS resource" and a full set of PRS beams transmitted from a TRP on a same frequency may be referred to as a "PRS resource set" or a "resource set of PRS," such as described in connection with FIG. 4. As shown by FIG. 5A, the DL-PRS transmitted from different TRPs and/or from different PRS beams may be multiplexed across symbols or slots.

In some examples, each symbol of the DL-PRS may be configured with a comb-structure in frequency, where the DL-PRS from a TRP of a base station may occupy every $N^{th}$ subcarrier. The comb value N may be configured to be 2, 4, 6, or 12. The length of the PRS within one slot may be a multiple of N symbols and the position of the first symbol within a slot may be flexible as long as the slot consists of at least N PRS symbols. The diagram 500A shows an example of a comb-6 DL-PRS configuration, where the pattern for the DL-PRS from different TRPs may be repeated after six (6) symbols.

FIG. 5B is a diagram 500B illustrating an example of UL-SRS transmitted from a UE in accordance with various aspects of the present disclosure. In one example, the UL-SRS from a UE may be configured with a comb-4 pattern, where the pattern for UL-SRS may be repeated after four (4) symbols. Similarly, the UL-SRS may be configured in an SRS resource of an SRS resource set, where each SRS resource may correspond to an SRS beam, and the SRS resource sets may correspond to a collection of SRS resources (e.g., beams) configured for a TRP. In some examples, the SRS resources may span 1, 2, 4, 8, or 12 consecutive OFDM symbols. In other examples, the comb size for the UL-SRS may be configured to be 2, 4, or 8.

Figure 6:
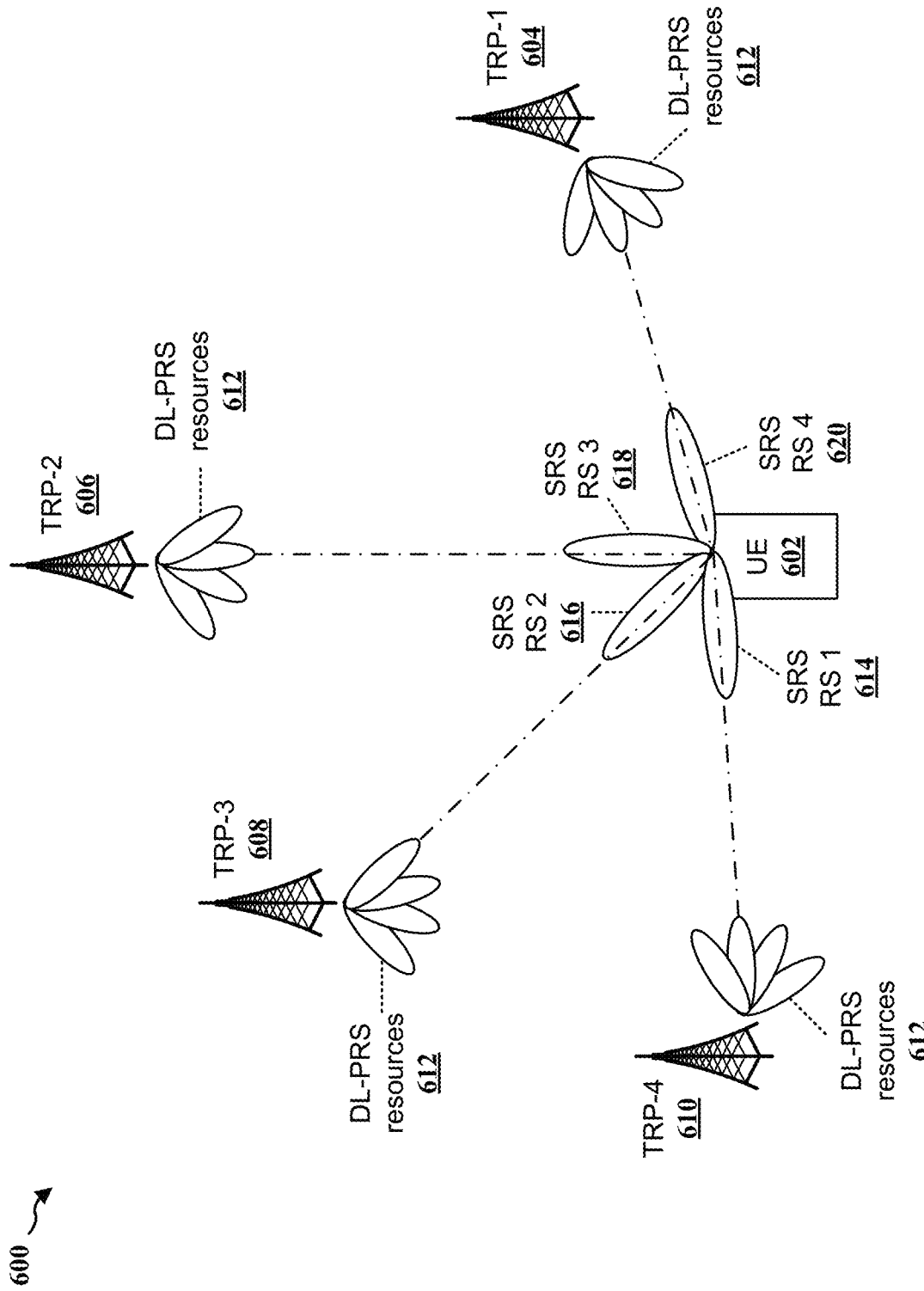
FIG. 6 is a diagram illustrating an example of estimating a position of a UE based on multi-round trip time (RTT) measurements from multiple TRPs in accordance with various aspects of the present disclosure.

FIG. 6 is a diagram 600 illustrating an example of estimating a position of a UE based on multi-RTT measurements from multiple TRPs in accordance with various aspects of the present disclosure. A UE 602 may be configured by a serving base station to decode DL-PRS resources 612 that correspond to and are transmitted from a first TRP 604 (TRP-1), a second TRP 606 (TRP-2), a third TRP 608 (TRP-3), and a fourth TRP 610 (TRP-4). The UE 602 may also be configured to transmit UL-SRSs on a set of UL-SRS resources, which may include a first SRS resource 614, a second SRS resource 616, a third SRS resource 618, and a fourth SRS resource 620, such that the serving cell(s), e.g., the first TRP 604, the second TRP 606, the third TRP 608, and the fourth TRP 610, and as well as other neighbor cell(s), may be able to measure the set of the UL-SRS resources transmitted from the UE 602. For multi-RTT measurements based on DL-PRS and UL-SRS, as there may be an association between a measurement of a UE for the DL-PRS and a measurement of a TRP for the UL-SRS, the smaller the gap is between the DL-PRS measurement of the UE and the UL-SRS transmission of the UE, the better the accuracy may be for estimating the position of the UE and/or the distance of the UE with respect to each TRP.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Figure 5:
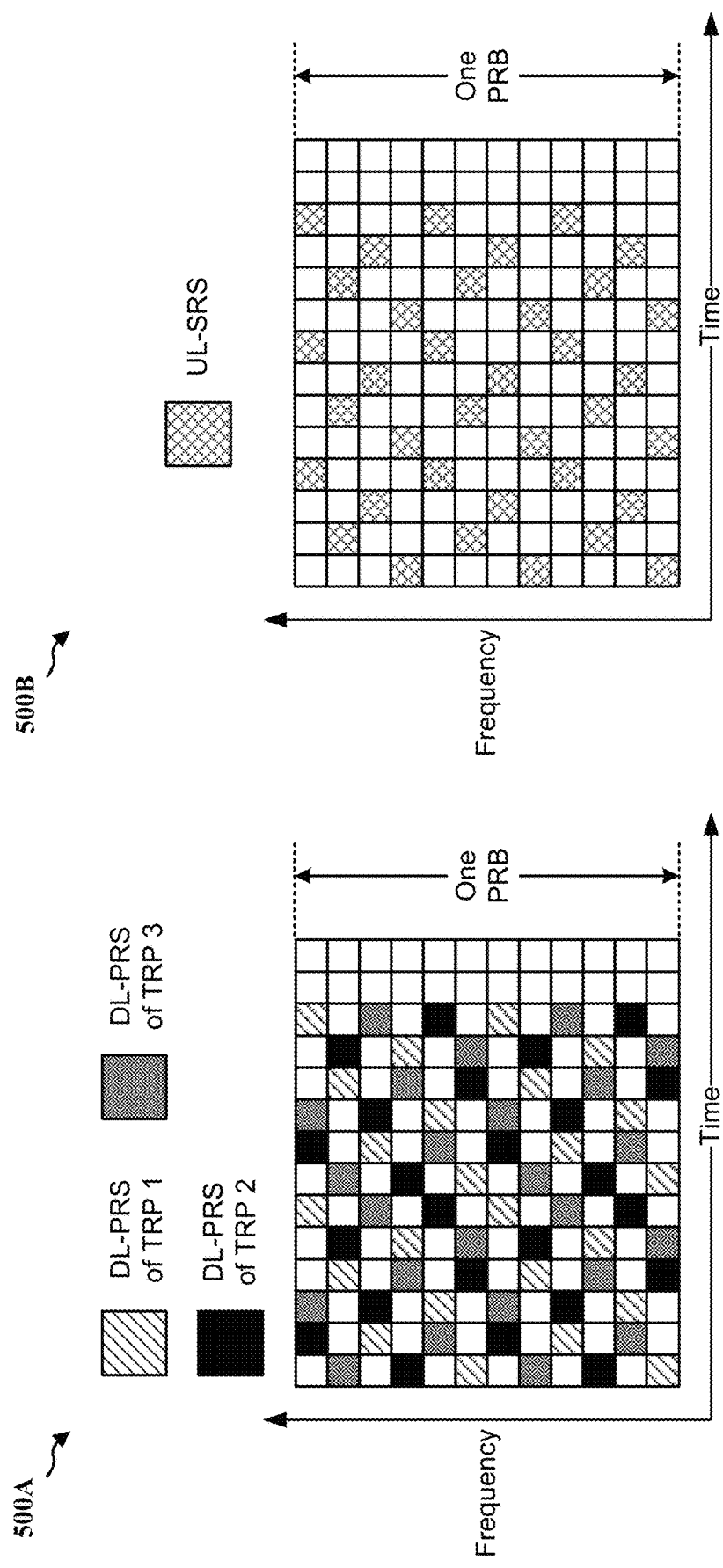
FIG. 5A is a diagram illustrating an example of downlink-positioning reference signal (DL-PRS) transmitted from multiple transmission-reception points (TRPs) in accordance with various aspects of the present disclosure.
FIG. 5B is a diagram illustrating an example of uplink-sounding reference signal (UL-SRS) transmitted from a UE in accordance with various aspects of the present disclosure.

In addition to network based positioning methods, such as described in connection with FIGS. 4 to 6, the position of a UE may also be determined based on radio frequency (RF) fingerprints. In some scenarios, RF transmitted from a wireless device (e.g., a UE, a TRP, a wireless access point (AP), etc.) or from a group of wireless devices may contain one or more features/patterns that are different from another wireless device or another group of wireless devices. In other words, RF transmitted from a wireless device or from a group of wireless devices may be unique, and the unique feature/pattern associated with this RF may be referred to as an RF fingerprint. For purposes of the present disclosure, technology that is associated with RF fingerprint may be referred to as "RF fingerprinting" and/or "RFFP," and positioning methods associated with RF fingerprinting may be referred to as "RF fingerprinting-based positioning," "RFFP-based positioning," and/or "RFFP positioning." RF fingerprinting aims to develop a unique RF fingerprint for a wireless device that may be used as an identity, which may be similar to how a biological fingerprint operates. For example, an RF fingerprint may include radio measurements from multiple APs, e.g., received signal strengths (RSS), path-loss, and/or channel impulse response measurements, etc., to provide a fingerprint of radio conditions at a specific location. Then, the location of a fingerprint may be estimated using the known location of similar fingerprints previously recorded. For example, RF fingerprints from different locations may be captured and recorded in a database. Thus, if an RF fingerprint captured by a wireless device matches an RF fingerprint stored in the database, the location of the wireless device may be estimated.

In some examples, the RF fingerprint database may be created and/or maintained based on machine learning (ML), and RFFP positioning with ML may be referred to as ML RFFP positioning. For ML RFFP positioning, RF fingerprints and their associated positions may be used as features and labels, respectively, to train an ML module in a supervised manner. After the ML module is being trained, the ML module may be used to estimate positions by passing it with newly captured RF fingerprints. In other words, an ML module may be configured to collect RF fingerprints and their associated locations, and this process may be referred to as ML position training or simply ML training. After the ML module is trained (e.g., RF fingerprints stored in the database are associated with known locations with certain level of certainties/accuracies), the ML module may be used for estimating the location of a detected/captured RF fingerprint, and this process may be referred to as ML position inference or simply ML inference. In some examples, ML position training/inference may be applied on UE side and/or on the network side. The RFFP ML training and inference may also be based on millimeter wave (mmW or mmwave), sub-THz, and/or THz frequencies.

Figure 7:
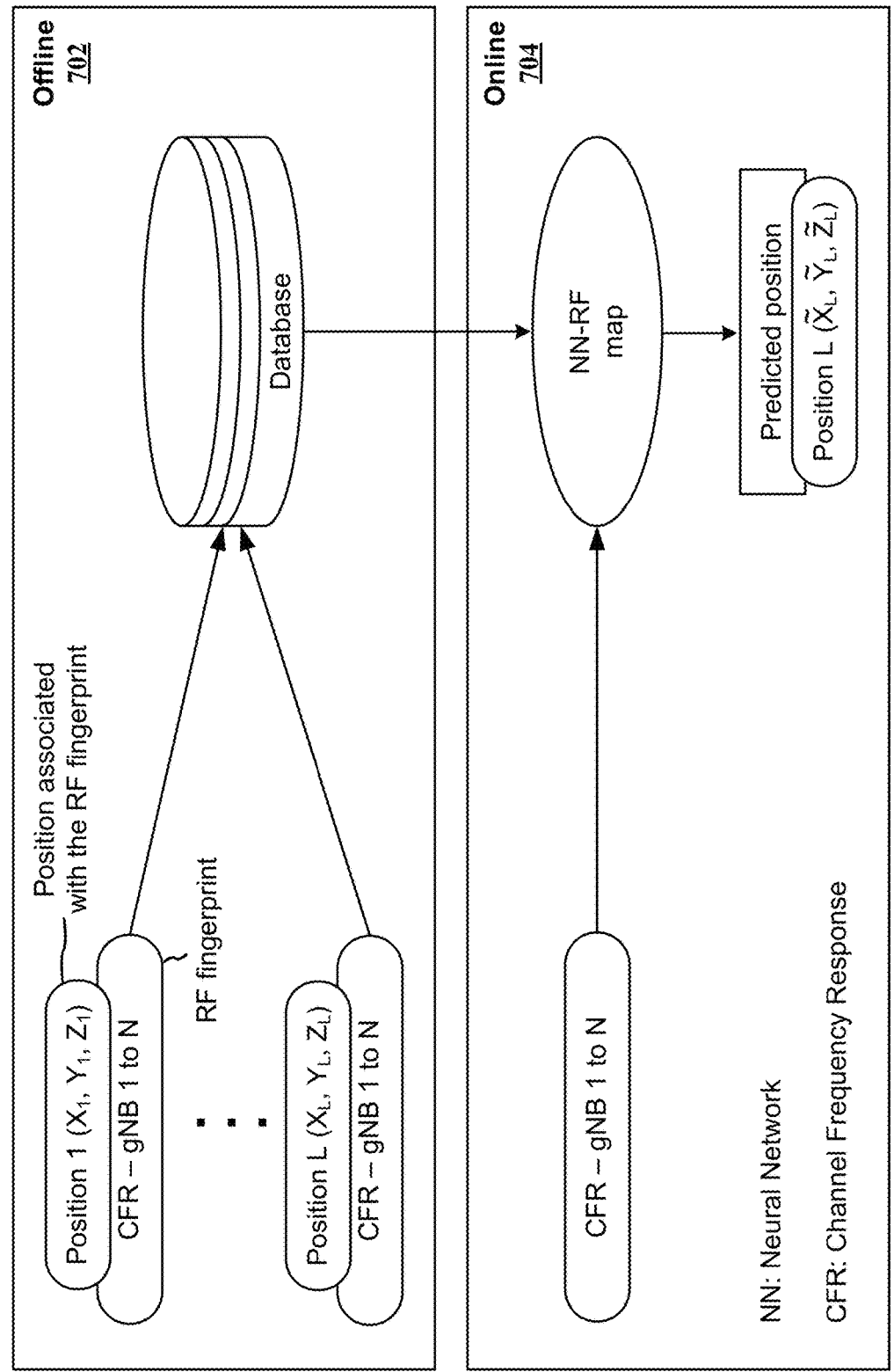
FIG. 7 is a diagram illustrating an example of machine learning (ML) position training and inference for radio frequency fingerprinting (RFFP) in accordance with various aspects of the present disclosure.

FIG. 7 is a diagram 700 illustrating an example of ML position training and inference for RFFP in accordance with various aspects of the present disclosure. During an offline stage 702 (which may also be referred to as a training stage), a database may be configured to collect RF fingerprints, such as channel frequency responses (CFRs), and their associated locations (e.g., locations in which the CFRs are captured). As such, each fingerprint in the database may be associated to a known location, such as corresponding to a local coordinate (X, Y) or (X, Y, Z), a global coordinate (latitude, longitude), a ground truth location, an address, and/or a label, etc. The collection of RF fingerprints may be based on site surveying, crowdsourcing, or by other means. After the RF fingerprints and their associated locations are collected, the database may process them and create a mapping between the RF fingerprints and their associated locations. The mapping may be accessed by a neural network (NN) or an ML module associated with the NN.

At an online stage 704 (which may also be referred to as an operational stage or a training stage), the NN or the ML module may receive RF fingerprint captured by a wireless device that has an unknown location. The NN may compare the RF fingerprint with unknown location to the mapping, select one or more RF fingerprints from the mapping that are similar to the RF fingerprint with unknown location, and computer an estimated position for the wireless device. Throughout the process, the NN or the ML module may continue to update the mapping to increase the accuracy of the position estimation.

Aspects presented herein may improve accuracy of RFFP-based positioning by associating RF fingerprints with beam directions and/or beam features to improve the uniqueness of the RF fingerprints. Aspects presented herein may enable an ML module to map a directional RF fingerprint and/or beam feature inputs to device position as an output, where the direction RF fingerprint may include RF captured between pair(s) of antennas and/or beams (e.g., at least one antenna/beam of a transmitter and at least one antenna/beam of a receiver). For purposes of the present disclosure, an RF fingerprint that includes a feature associated with a transmitting antenna/beam and/or a receiving antenna/beam (e.g., beam pair(s) and/or an antenna pair(s)) may be referred to as a direction RF fingerprint or an RF fingerprint with a directional feature. For example, a directional RF fingerprint may be a channel impulse response (CIR) captured at one or more antenna pairs and/or one or more beam pairs, a channel frequency response (CFR) captured at one or more antenna pairs and/or one or more beam pairs, and/or a normalized histogram of received signal strength measured over a period and/or range in frequency captured at one or more antenna pairs and/or one or more beam pairs, etc.

Figure 8:
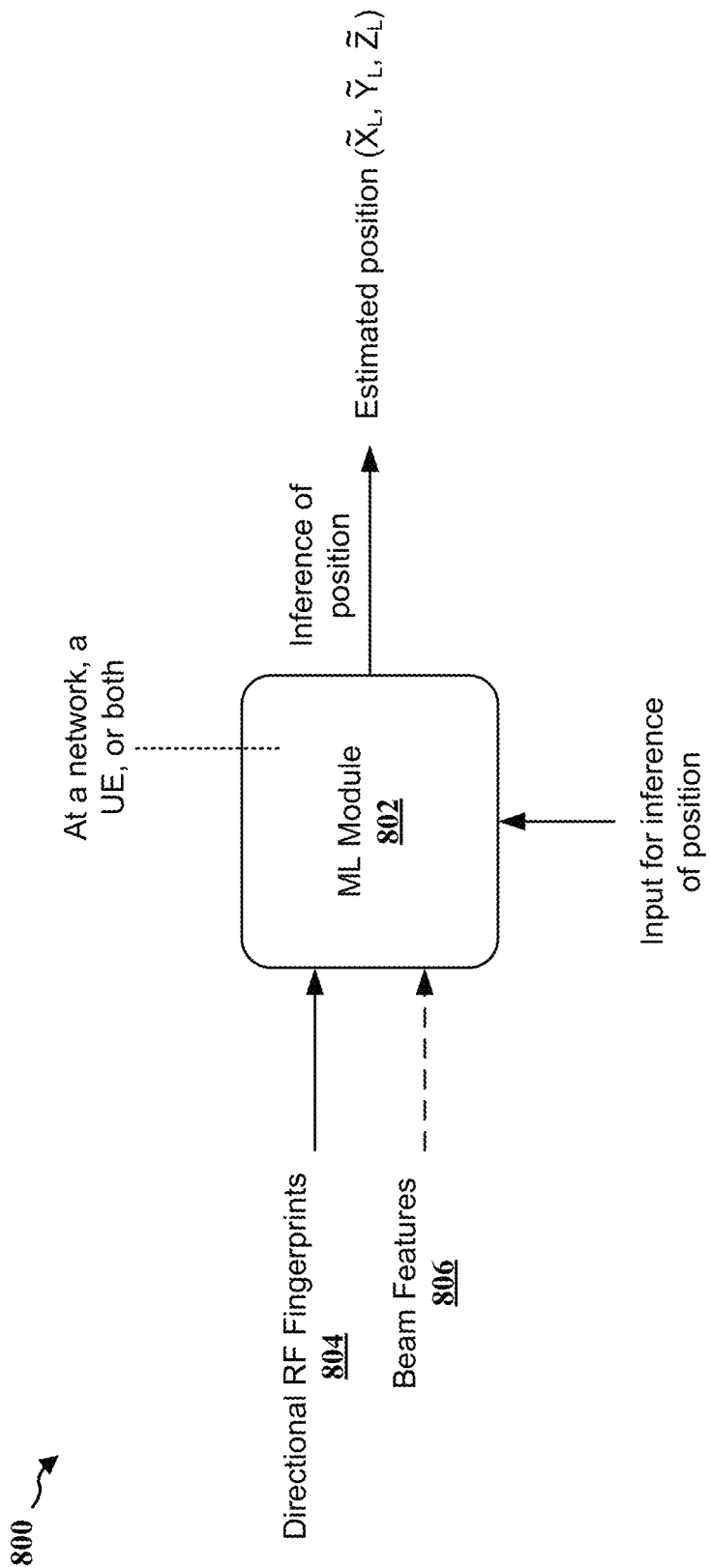
FIG. 8 is a diagram illustrating an example ML module in accordance with various aspects of the present disclosure.

FIG. 8 is a diagram 800 illustrating an example ML module in accordance with various aspects of the present disclosure. In one aspect, an ML module 802 (e.g., a NN, a deep NN, a random forest, etc.) may receive directional RF fingerprints 804 and their associated locations from a database, such as described in connection with FIG. 7. In some examples, the ML module 802 and the database may be within a same entity (e.g., a UE, a base station) or connected to each other. In other examples, the ML module 802 and the database may locate remotely (e.g., the ML module 802 may access the database remotely). The ML module 802 may be associated with a UE (e.g., located at a UE), associated with a network entity (e.g., a base station), or both. In addition, the training of the ML module 802 may be at a UE and/or at a network entity. After a mapping is created between the directional RF fingerprints 804 and their known locations (e.g., by the database or by the ML module 802), the ML module 802 may estimate the position of an RF fingerprint based on the mapping. In some examples, the directional RF fingerprints 804 may further be associated with one or more beam features 806, and the ML module 802 may further estimate the position of an RF fingerprint based on the one or more beam features 806.

Figure 9:
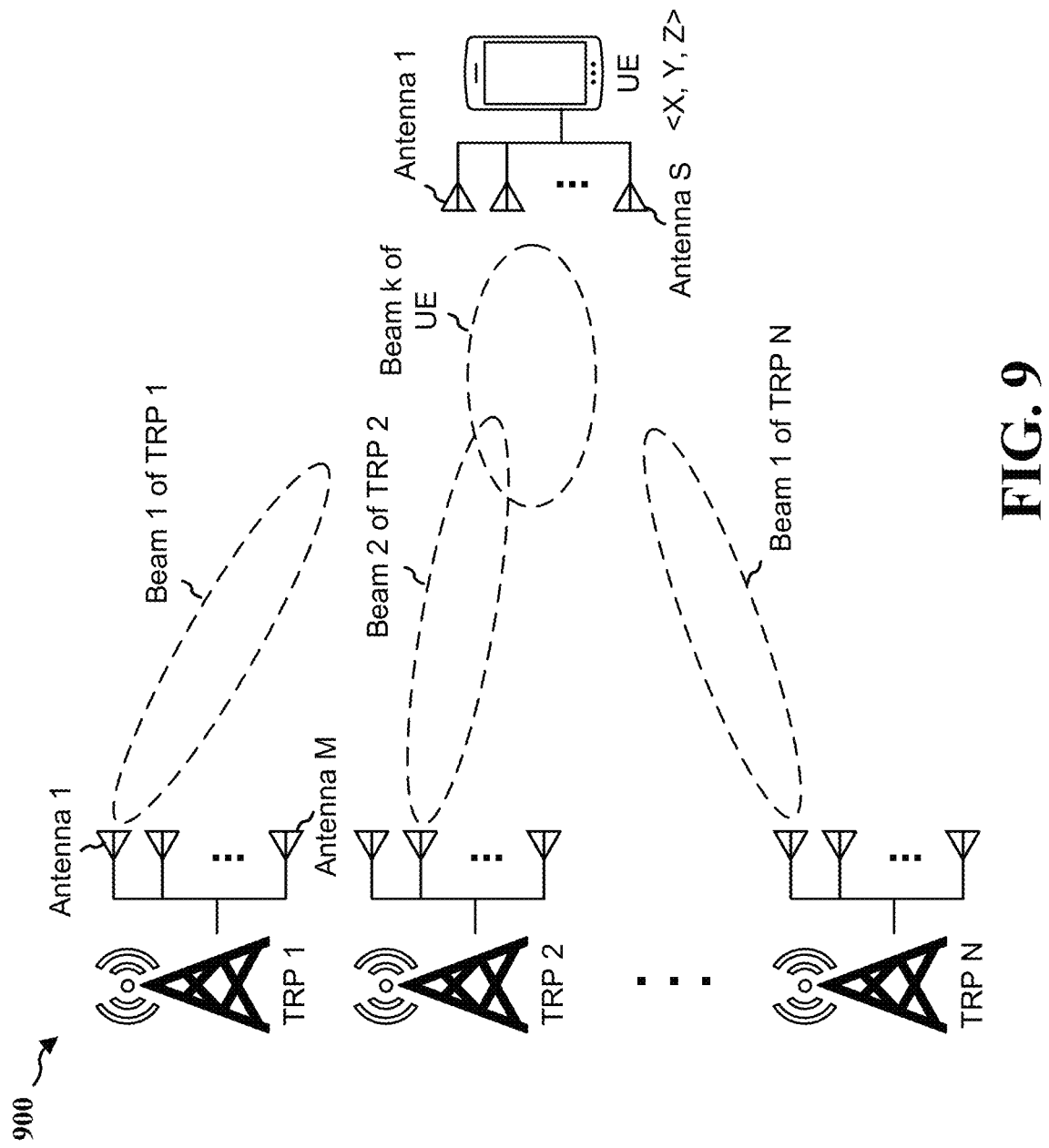
FIG. 9 is a diagram illustrating an example directional radio frequency (RF) fingerprint in accordance with various aspects of the present disclosure.

FIG. 9 is a diagram 900 illustrating an example directional RF fingerprint in accordance with various aspects of the present disclosure. A UE may receive RF signals from a plurality of TRPs, which may include a first TRP (TRP 1), a second TRP (TRP 2), and up to an $N^{th}$ TRP (TRP N) (collectively referred to as "TRPs"). Each of the TRPs may include multiple antennas that are capable of transmitting signals in multiple beam directions). For example, the first TRP may have ten antennas that are capable of forming twenty transmission beams (e.g., pointing to multiple directions), the second TRP may have fifteen antennas that are capable of forming thirty transmission beams, and the $N^{th}$ TRP may also have twenty antennas that are capable of forming twenty transmission beams, etc. Similarly, the UE may be able to receive signals via multiple antennas and via multiple beam directions. For example, the UE may have four antennas that are capable of forming six reception beams, where the UE may receive signals via six beam directions. As such, a TRP may transmit a signal to the UE using one or more of its transmission antennas and/or one or more of its transmission beams, and the UE may receive the signal using one or more of its reception antennas and/or one or more of its reception beams. For purposes of the present disclosure, a transmission antenna that is used by a transmitting device or a transmitter (e.g., a UE or a TRP) for transmitting the signal and a reception antenna that is used by a receiving device or a receiver (e.g., a TRP or a UE) for receiving the signal may be referred to as an "antenna pair," and a transmission beam that is used by a transmitting device or a transmitter for transmitting the signal and a reception beam that is used by a receiving device or a receiver for receiving the signal may be referred to as a "beam pair."

In one aspect of the present disclosure, a directional RF fingerprint (e.g., the directional RF fingerprints 804) may include an RF feature that is captured at multiple antenna pairs between the UE and one or more TRPs. For example, a first antenna pair of the multiple antenna pairs may correspond to a first transmission antenna of the first TRP and a $k^{th}$ reception antenna of the UE, a second antenna pair of the multiple antenna pairs may correspond to a second transmission antenna of the second TRP and the $k^{th}$ reception antenna of the UE, and an $N^{th}$ antenna pair of the multiple antenna pairs may correspond to a first transmission antenna of the $N^{th}$ TRP and the $k^{th}$ reception antenna of the UE, etc. In other words, the RF fingerprint may include directionally captured RF features, such as signals transmitted from multiple TRPs (e.g., from one antenna of each TRP) and received by the UE at one or more reception antennas. Thus, if there are N TRPs, the directionally RF feature may be captured based on N antenna pairs if the UE uses one reception antenna, or based on N×M antenna pairs if the UE uses M reception antennas.

In another example, the multiple antenna pairs used for capturing the directional RF feature may include signals transmitted from each antenna of a TRP and received by each antenna of the UE. For example, as shown by a diagram 1000 of FIG. 10, if the first TRP (TRP 1) has N transmission antennas and the UE has k reception antennas, the RF feature may be captured based on N×k antenna pairs. Thus, if the first TRP has 10 transmission antennas (i.e., N=10) and the UE has 4 reception antennas (i.e., k=4), then the RF feature may be based on 40 antennas pairs (10×4=40) between the first TRP and the UE.

Figure 11:
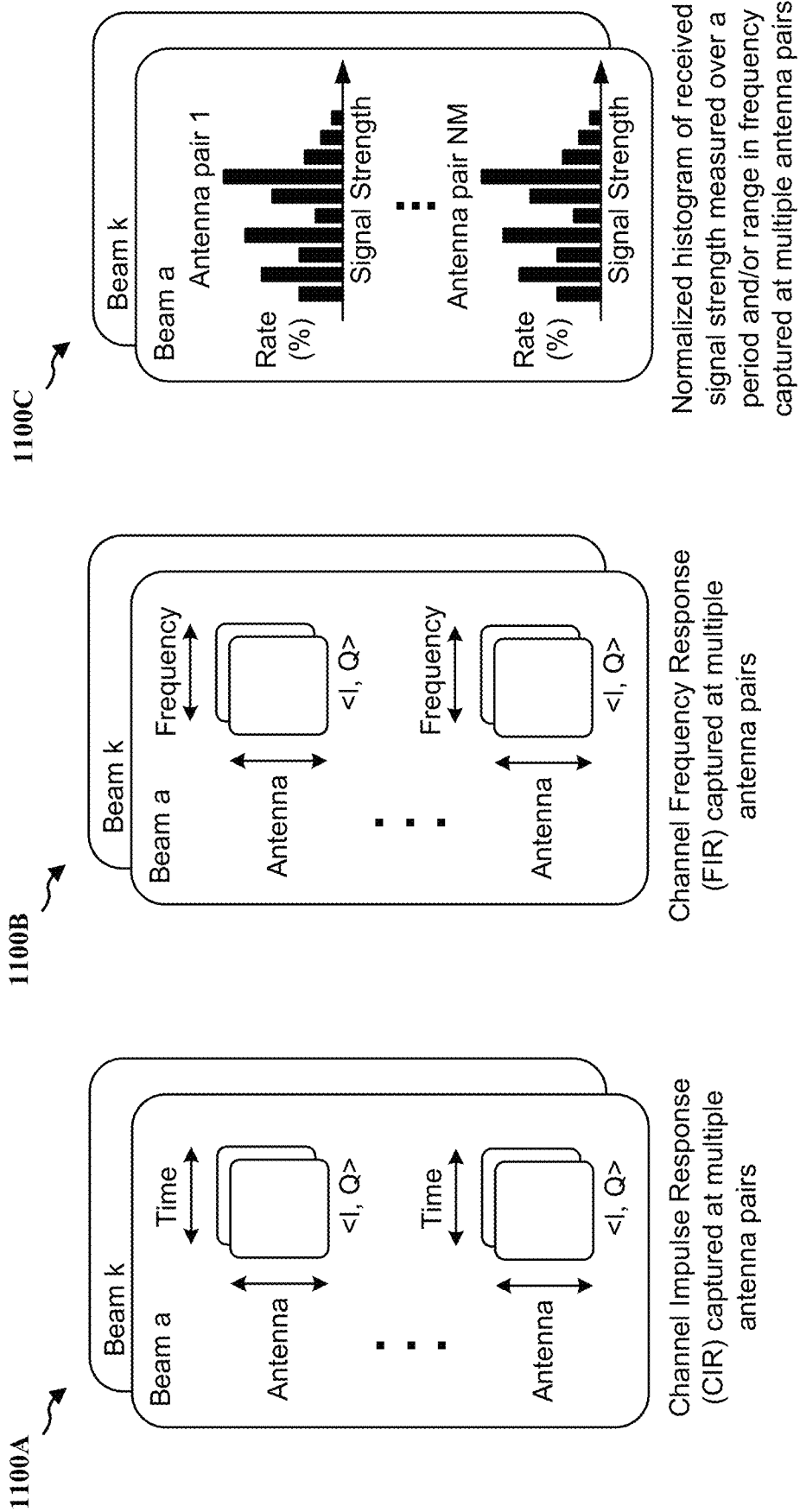
FIG. 11A is a diagram illustrating an example RF feature in accordance with various aspects of the present disclosure.
FIG. 11B is a diagram illustrating an example RF feature in accordance with various aspects of the present disclosure.
FIG. 11C is a diagram illustrating an example RF feature in accordance with various aspects of the present disclosure.

In one example, as shown by a diagram 1100A of FIG. 11A, the RF feature may be based on CIR (or directional CIR) captured at multiple antenna pairs. In another example, as shown by a diagram 1100B of FIG. 11B, the RF feature may be based on CFR (or directional CFR) captured at multiple antenna pairs (e.g., the CIR may be the inverse Fourier transform of the CFR). In another example, as shown by a diagram 1100C of FIG. 11C, the RF feature may be based on a normalized histogram of received signal strength measured over a period and/or range in frequency captured at multiple antenna pairs. For example, the RF feature may be based on signal strength measured over a defined duration or over a frequency range at the multiple antenna pairs.

Figure 10:
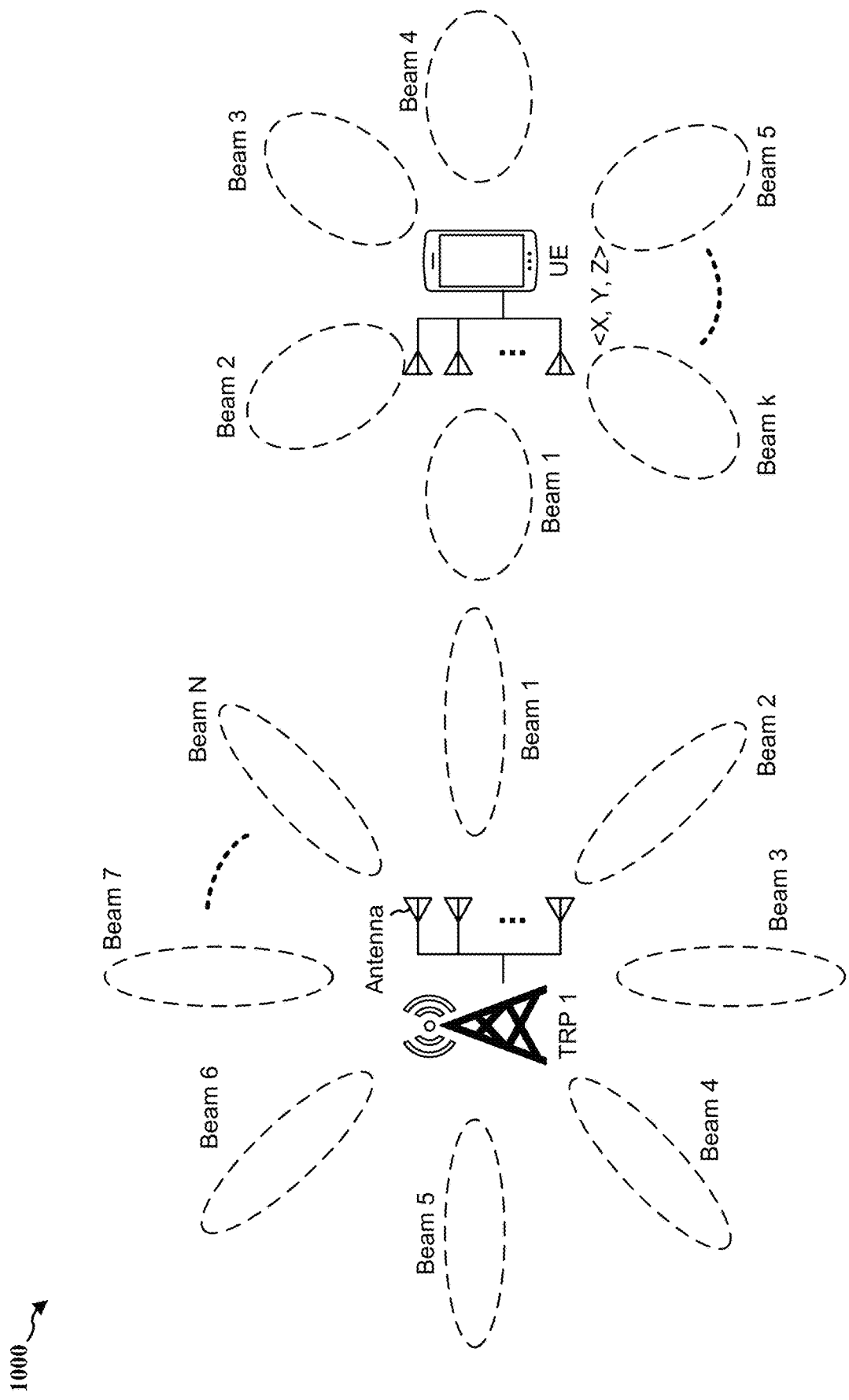
FIG. 10 is a diagram illustrating an example beam pair in accordance with various aspects of the present disclosure.

As described in connection with FIG. 10, if multiple antenna pairs used for capturing the directional RF feature include signals transmitted from each antenna of a TRP and received by each antenna of the UE, there may be a large number of antenna pairs to be processed by a database or an ML module. Thus, in another aspect of the present disclosure, a directional RF fingerprint (e.g., the directional RF fingerprints 804) may include an RF feature that is based on a complex-sum captured at multiple antenna pairs between the UE and one or more TRPs. For example, the RF feature may be based on a complex-sum of CIR captured at multiple antenna pairs, a complex-sum of CFR captured at multiple antenna pairs, and/or a normalized histogram of received signal strength measured over a period and/or range in frequency captured at multiple antenna pairs and beam pairs.

For example, referring back to FIG. 10, a complex sum of CIR captured at multiple antenna pairs may be calculated based on the following. The first TRP (TRP 1) may have $M_{tr}$ transmission antennas and N transmission beams, and the UE may have $M_{tu}$ reception antennas and k receptions beams. As such, there may be $M_{tr}M_{tu}$ antenna pairs and kN TX-RX beam pairs. If $cir_{j,i}$ indicates CIR captured for the ith beam pair and jth antenna pair, then an RF fingerprint at antenna pair j may be based on a complex-sum of CIRs at antenna pair $j=\Sigma_i cir_{j,i}$ for $j \in \{1, \ldots, kN\}$.

Figure 12:
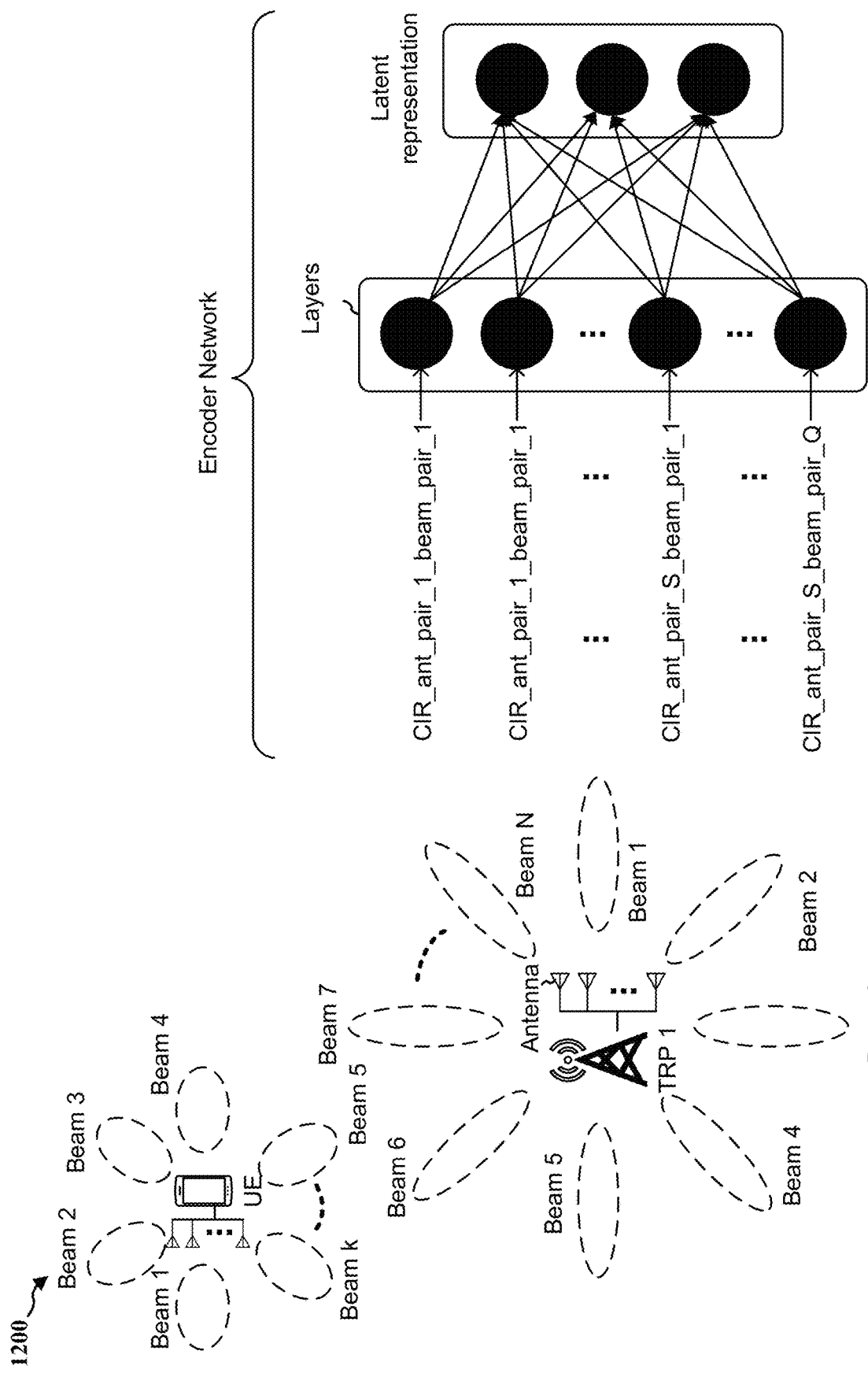
FIG. 12 is a diagram illustrating an example directional RF fingerprint with compression in accordance with various aspects of the present disclosure.

In another aspect of the present disclosure, to further reduce the size of an RF fingerprint, the RF features of the RF fingerprint may further be compressed. FIG. 12 is a diagram 1200 illustrating an example directional RF fingerprint with compression in accordance with various aspects of the present disclosure. In one example, RF features captured from multiple antenna pairs may be compressed using an encoder network (which may be associated with an ML module). An encoder network may include a sequence of layers that start with a high dimension of inputs, and the encoder network may map the inputs to a lower dimension of outputs. In other words, an encoder network may convert a large amount of inputs to a latent representation with a lesser amount of outputs. As such, a directional RF fingerprint (e.g., the directional RF fingerprints 804) may be based on a compression of RF features using encoder network. For example, an RF fingerprint may be based on compressed CIRs captured at multiple antenna pairs using encoder network, compressed CFRs captured at multiple antenna pairs using encoder network, and/or a compressed normalized histogram of received signal strength measured over a period and/or range in frequency captured at multiple antenna pairs and multiple beam pairs using encoder network. For example, as shown by the diagram 1200, different CIRs measured with different combinations of beam pairs and antenna pairs (e.g., CIR of beam pair 1 and antenna pair 1, CIR of beam pair 2 and antenna pair 1, beam pair 1 and antenna pair 2, beam pair 2 and antenna pair 2, etc.) may be compressed by an encoder network to yield a latent representation, where the latent representation may be a simplified model of input data created by a neural network.

Figure 13:
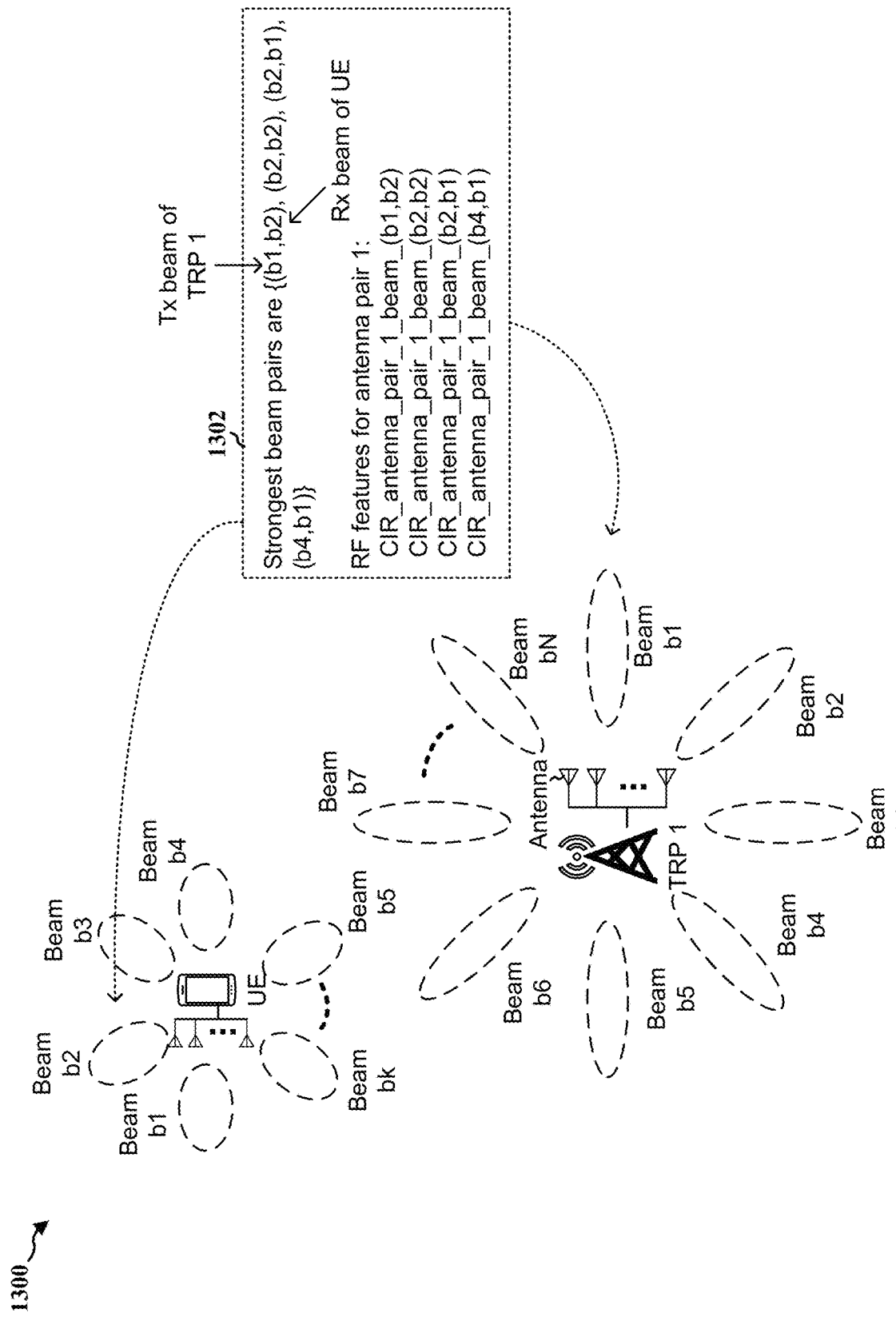
FIG. 13 is a diagram illustrating an example directional RF fingerprint based on strongest beam pair(s) in accordance with various aspects of the present disclosure.

In another aspect of the present disclosure, to further reduce the size of an RF fingerprint, the RF fingerprint may be based on a number of strongest beam pairs. FIG. 13 is a diagram 1300 illustrating an example directional RF fingerprint based on strongest beam pair(s) in accordance with various aspects of the present disclosure. In one example, the RF fingerprint may be based on P strongest CIRs (e.g., four strongest CIRs) captured at multiple antenna pairs, P strongest directional CFRs captured at multiple antenna pairs, and/or P strongest normalized histograms of received signal strength measured over a period and/or range in frequency captured at multiple antenna pairs. For example, as shown at 1302, the RF feature for a first antenna pair may be based on four strongest beam pairs.

As described in connection with FIG. 8, in some examples, the directional RF fingerprints 804 may further be associated with one or more beam features 806, such that the ML module 802 may further estimate the position of an RF fingerprint based on the one or more beam features 806. In other words, the one or more beam features 806 may also be inputted into the ML module 802 (or to the associated NN) in additional to the directional RF fingerprints 804.

In one example, the one or more beam features 806 may include a beam shape, such as the shape of a beam that is used for collecting or measuring the RF fingerprints, and/or shape of a beam that is used for transmitting RF signals (or RF fingerprints). For example, the beam shape may include a beam width (azimuth and/or elevation) and/or a normalized radiation pattern of a reception/transmission beam (e.g., beam pattern in azimuth and/or elevation directions), etc. The beam shape may also be stored as a look-up table in a UE or in a network entity, where the UE and the network entity may exchange the beam shape during operation (e.g., once during an operation lifetime).

In another example, the one or more beam features 806 may include a cumulative distribution function (CDF) and/or a probability density function (PDF) of beam-based spherical effective isotropic radiated power (EIRP) measurements. For example, a wireless device capturing RF fingerprints or transmitting RF signals/fingerprints may conduct spherical EIRP measurements for each beam configuration. Then, the CDF or PDF of $Z_j$ may be used to represent the feature of beam(s) used (e.g., reception beam(s), target beam(s), transmission beam(s), etc.), where ($Z_j$=EIRp$_j$−Pmax) and j may be an arbitrary beam index. In some examples, CDFs and/or PDFs of beams may be computed offline and stored as a look-up table. In other examples, the CDF and/or PDF of beam-based spherical EIRP measurements may further include at least one beam direction as additional feature(s), such as in terms of peak azimuth and/or elevation angles, etc.

Figure 14:
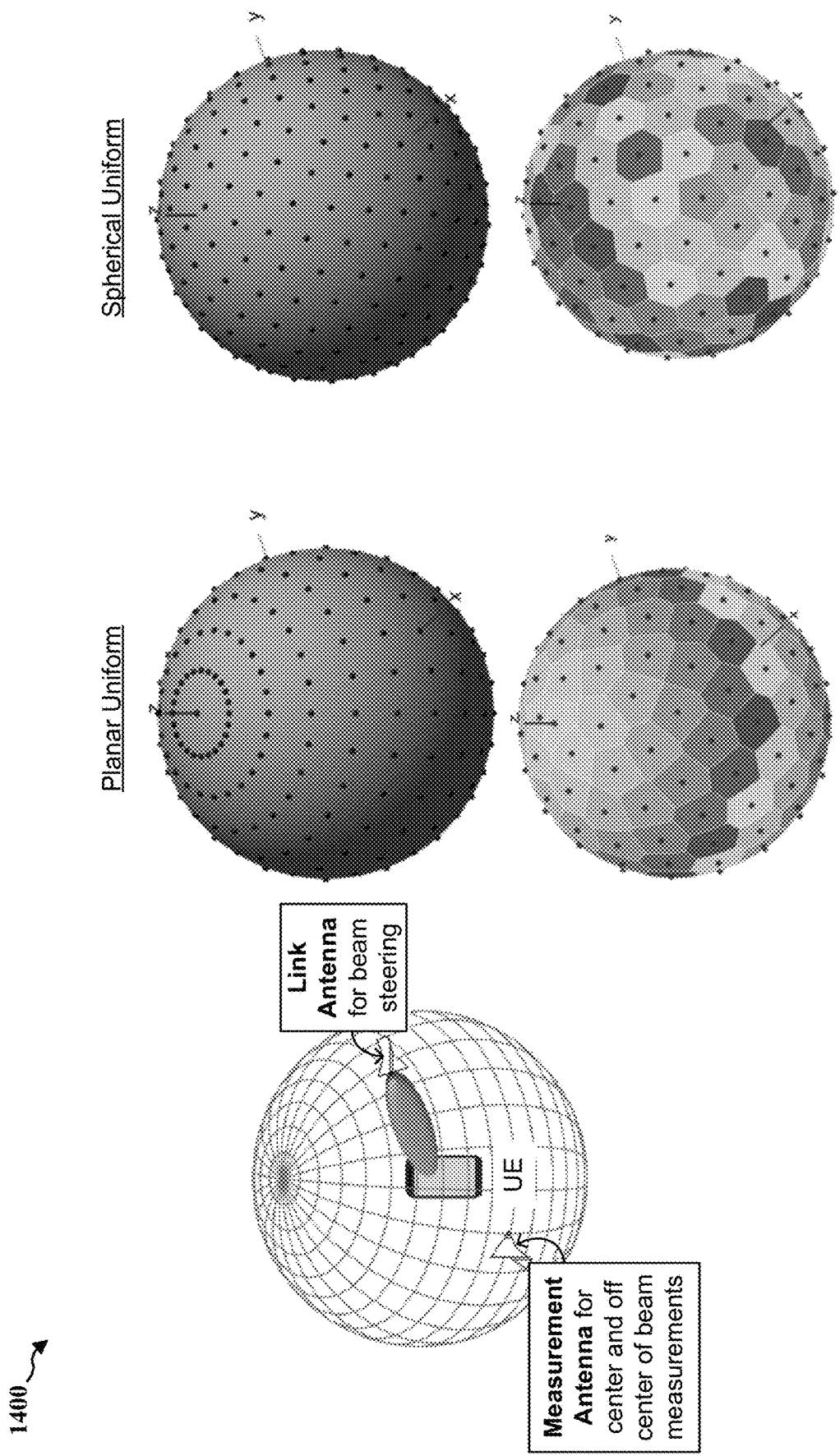
FIG. 14 is a diagram illustrating an example spherical coverage test in accordance with various aspects of the present disclosure.

For example, as shown by a diagram 1400 of FIG. 14, a spherical coverage test on a per-UE basis may be used to ensure composite beam pattern over all beams to be as wide as possible. The density of measurements may be based on a planar uniform configuration and/or a spherical uniform configuration. In one aspect of the present disclosure, the spherical coverage test is configured to extend to a per-beam basis to characterize inputs to the ML module along with RF fingerprints. For example, for each beam j in B, where B may be a set of beams (e.g., codebook), a wireless device may be configured to form beam j (e.g., codebook, setting of delay lines, etc.). Then, a spherical measurement test may be conducted in the far field region and EIRPs may be recorded in possible spherical directions (e.g., $E_j \leftarrow EIRP_{\varphi_i,\theta_i}$, where $E_j$ is the set of EIRPs recorded for beam j). Granularity of measurements in terms of angular azimuth and elevation (e.g., $\delta\varphi$, $\delta\theta$) directions may be decided based on regulatory specifications. For example, based on regulatory requirements, $\delta\varphi$, $\delta\theta$ may be configured to be uniform or non-uniform. In addition, each EIRP measurement may be annotated with its azimuth $\varphi_i$ and elevation $\theta_i$ directions. Then, the output may be denoted as $\overline{E}=\{E_1, \ldots, E_N\}$, where $E_j$ contains EIRPs captured in all possible azimuth/elevation angles for beam j, e.g., $E_j=\{EIRP_{\varphi,\theta}:\varphi\in\Phi, \theta\in\Theta\}$.

In another example, the one or more beam features 806 may include beam configuration, such as phase shifts and/or delays of a beam (e.g., a reception beam, a beam used for capturing RF fingerprints, etc.). The beam configuration may be based on a standardized codebook (e.g., beam codebook) and/or based on a customized codebook. The beam configuration may also be stored as a look-up table in a UE or in a network entity, where the UE and the network entity may exchange the beam configuration during operation (e.g., once during an operation lifetime).

In another example, the one or more beam features 806 may include one or more beam measurements, such as reference signal received power (RSRP) and/or signal-to-interference-plus-noise ratio (SINR), etc., of a beam (e.g., a transmission beam, a reception beam, etc.).

Figure 15:
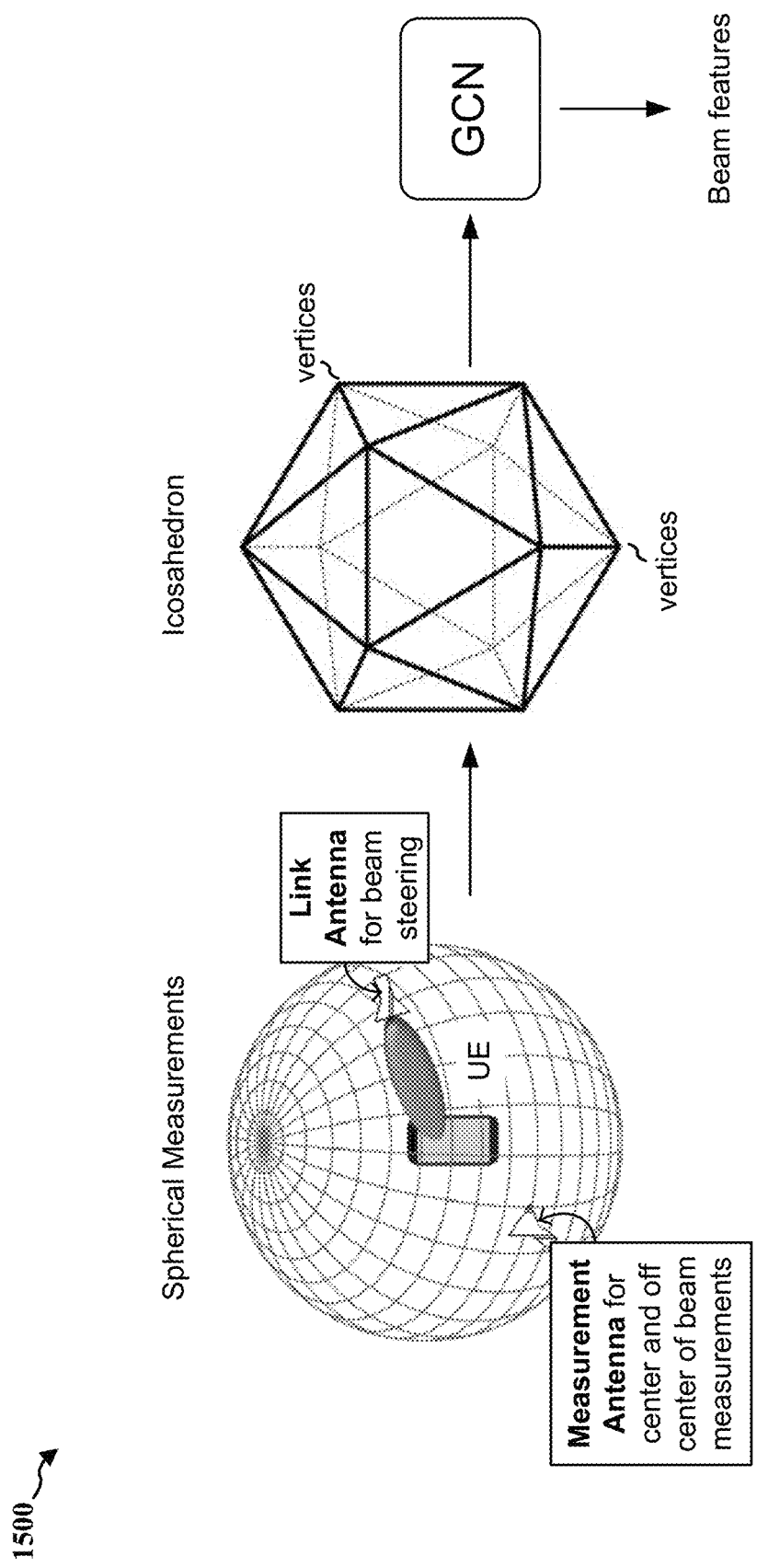
FIG. 15 is a diagram illustrating an example of extracting beam feature(s) based on graph convolutional network (GCN) in accordance with various aspects of the present disclosure.

In another example, the one or more beam features 806 may include beam embedding based on a graph convolutional network (GCN). FIG. 15 is a diagram 1500 illustrating an example of extracting beam feature(s) based on a GCN in accordance with various aspects of the present disclosure. In one example, spherical measurements may be performed at a wireless device, and beam gains measured at different azimuth and elevation angles may be represented using an icosahedron graph where vertices may correspond to the locations where beam gains are measured. Then, the icosahedron may be encoded using a GCN into a compact latent representation that may be used as a beam feature. Similarly, the beam embedding based on a GCN (or the beam feature) may also be stored as a look-up table in a UE or in a network entity, where the UE and the network entity may exchange the beam embedding/feature during operation (e.g., once during an operation lifetime).

Referring back to FIG. 8, after the ML module 802 is trained or has an access to a database that includes a mapping between directional RF fingerprints 804/beam features 806 and their corresponding locations, the ML module 802 may perform interference of a position based on a directional RF fingerprint/beam feature input. For example, based on a received directional RF fingerprint, the ML module 802 may estimate a local coordinate (X, Y) or (X, Y, Z), a global coordinate (latitude, longitude), a ground truth location, an address, and/or a label, etc., based on the mapping.

Figure 16:
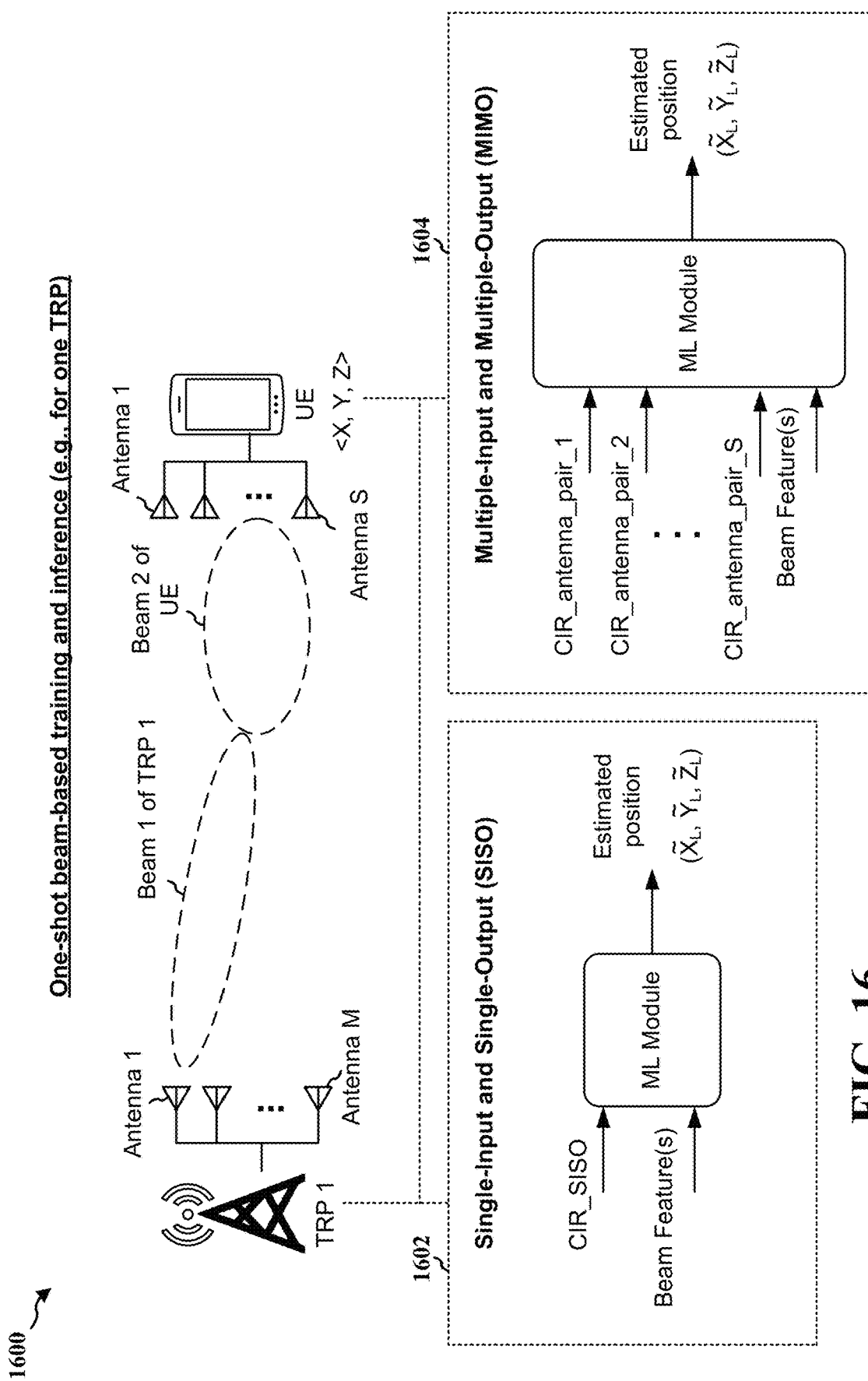
FIG. 16 is a diagram illustrating an example of an ML module training and inference based on one-shot beam in accordance with various aspects of the present disclosure.

FIG. 16 is a diagram 1600 illustrating an example of an ML module training and inference based on one-shot beam in accordance with various aspects of the present disclosure. In one aspect of the present disclosure, the inference of position may be handled by considering one-shot beamforming and constructing applicable RF fingerprint(s) and beam feature(s) that are used as input(s) for ML positioning. For example, a TRP may be communicating with a UE based on a beam pair (e.g., a first transmission beam of the TRP and a second reception beam of the UE). When a positioning session based on RFFP is initiated for the UE, the UE may use the same beam pair for performing an RF measurement (e.g., for receiving and measuring PRS transmitted from the TRP) and capturing an RF fingerprint and/or beam feature(s). Then, the UE may perform the inference if the ML module (e.g., the ML module 802) is at the UE side, or the UE may send the captured RF fingerprint and/or beam feature(s) back to the network (e.g., to a serving base station) to perform the inference if the ML module is at the network side. As the beam used for positioning may be more likely to be the most recent beam used for communication, the one-shot beam inference configuration may provide a short positioning latency. As such, for the one-shot beam-based inference configuration, the ML module may be trained to map a directional RF fingerprint feature (e.g., an input) captured from one TRP over one beam pair to a UE location (e.g., an output), where the captured RF fingerprint and beam feature(s) from the one TRP may be passed to the ML module for the ML module training and inference. In some examples, the beam feature(s) may be included as an additional input. Also, the RF fingerprint features may also include RF fingerprints of different transmission-reception (Tx-Rx) antenna pairs (if available).

In one aspect, as shown at 1602, the ML module training and inference may be based on a single-input and single-output (SISO) model, where the ML module may receive one RF fingerprint (e.g., a CIR, a CFR, and/or a normalized histogram, etc., of a beam pair) and one or more beam features (if available) for the ML module training and inference, and the ML module may map the one RF fingerprint and the one or more beam features (if available) to a position for the ML module training and inference. In another aspect, as shown at 1604, the ML module training and inference may be based on a multiple-input and multiple-output (MIMO) configuration, where the ML module may receive multiple RF fingerprints (e.g., a CIR, a CFR, and/or a normalized histogram, etc., of multiple antenna pairs) and one or more beam features (if available) for the ML module training and inference, and the ML module may map the multiple RF fingerprints and the one or more beam features (if available) to a position for the ML module training and inference.

FIG. 17 is a diagram 1700 illustrating an example of an ML module training and inference based on beam sweeping in accordance with various aspects of the present disclosure. In another aspect of the present disclosure, the inference of position may be based on beam-sweeping. For example, a UE and a network (e.g., a TRP) may each sweep different beams and collect applicable RF fingerprints and beam features that may be used as inputs for ML positioning. For example, when a positioning session based on RFFP is initiated for the UE, if the TRP has eight (8) transmission beams and the UE has six (6) reception beams, the TRP may transmit at least one PRS to the UE via its eight transmission beams and the UE may receive the PRS via its six reception beams based on beam sweeping. Then, the UE may collect applicable RF fingerprints and/or beam features captured during the beam sweeping. Similarly, based on the captured RF fingerprints and/or beam features, the UE may perform the inference if the ML module (e.g., the ML module 802) is at the UE side, or the UE may send the captured RF fingerprints and/or beam features back to the network (e.g., to a serving base station) to perform the inference if the ML module is at the network side. In some examples, the beam sweeping overhead may be reduced if the UE and/or the network have the capability to activate multiple beams simultaneously. For example, if the TRP has the capability to transmit the PRS via multiple transmission beams at a time, and/or the UE has the capability to receive the PRS via multiple reception beams at a time, the beam sweeping overhead used for the ML positioning may be reduced to improve positioning latency. As such, the ML module may be trained to map RF fingerprint features (e.g., inputs) captured from one TRP over multiple swept beam pairs to a UE location (e.g., an output), where the captured RF fingerprints based on beam sweep and beam feature(s) (if available) from the one TRP may be passed to the ML module for the ML module training and inference. Similarly, beam feature(s) of the swept beams may be included as an additional input.

In one example, as shown at 1702, the RF fingerprint feature(s) may include RF fingerprints (e.g., CIRs, CFRs, and/or normalized histograms, etc.) of different transmission-reception antenna pairs (if available). In another example, as shown at 1704, the RF fingerprint feature(s) may include the sum (e.g., $\Sigma_i$) of RF fingerprints captured over swept beams. In addition, the swept beams may include a subset of transmission and/or reception beams.

Figure 18:
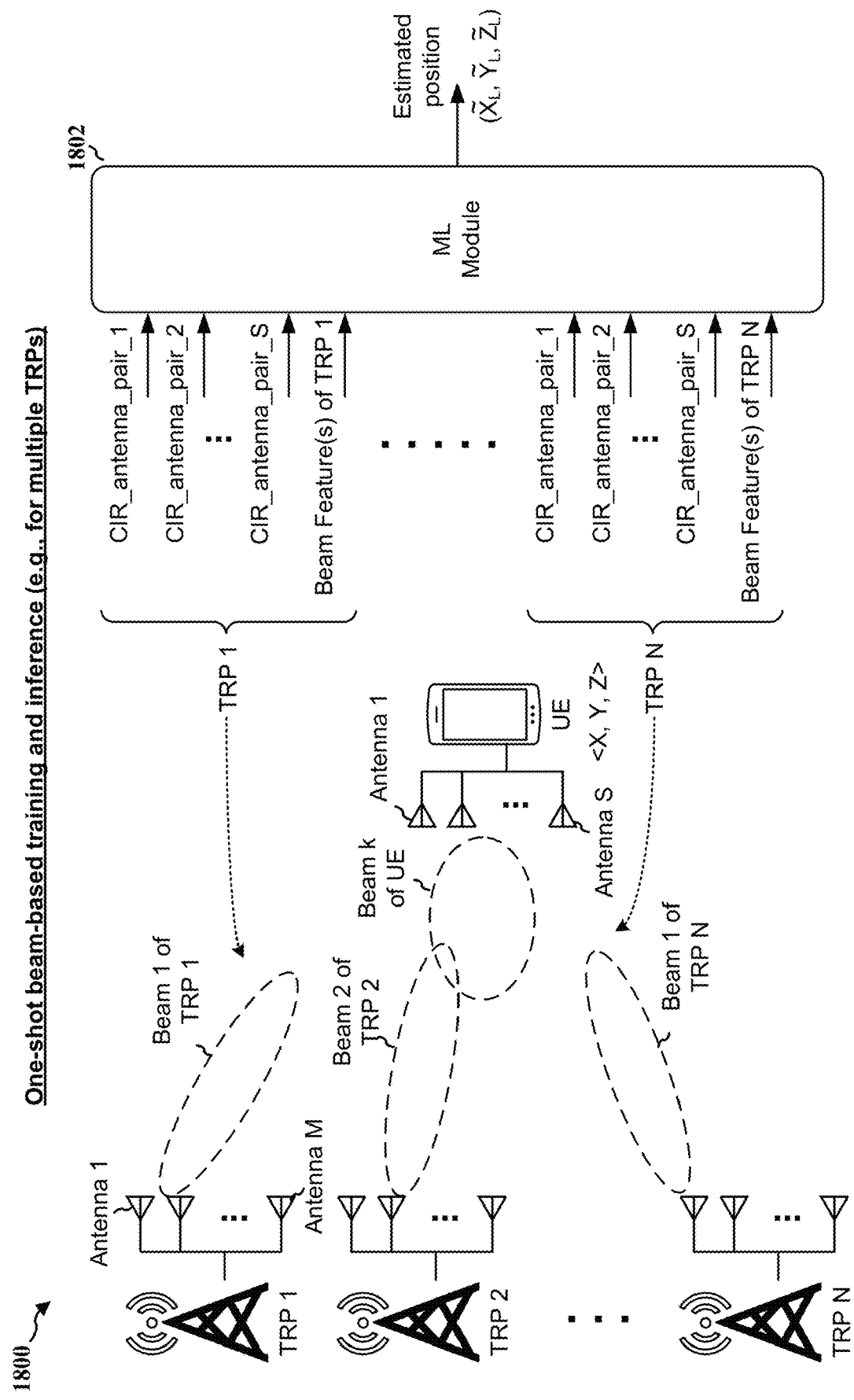
FIG. 18 is a diagram illustrating an example of an ML module training and inference based on multi-TRP one-shot beam in accordance with various aspects of the present disclosure.

FIG. 18 is a diagram 1800 illustrating an example of an ML module training and inference based on multi-TRP one-shot beam in accordance with various aspects of the present disclosure. In another aspect of the present disclosure, the inference of position may be handled by considering one-shot beamforming between a UE and multiple TRPs and constructing applicable RF fingerprint(s) and beam feature(s) that are used as input(s) for ML positioning. For example, multiple TRPs may be communicating with a UE based on multiple beam pairs (e.g., one beam pair between each TRP and the UE). When a positioning session based on RFFP is initiated for the UE, the UE may use the same beam pairs for performing RF measurements (e.g., for receiving and measuring PRSs transmitted from the multiple TRPs) and capturing RF fingerprints and/or beam feature(s) from the multiple TRPs. Then, the UE may perform the inference if the ML module (e.g., the ML module 802) is at the UE side, or the UE may send the captured RF fingerprints and/or beam feature(s) back to the network (e.g., to a serving base station) to perform the inference if the ML module is at the network side. As the beam used for positioning may be more likely to be the most recent beam used for communication, the one-shot beam inference configuration may provide a short positioning latency. As such, for the multi-TRP one-shot beam-based inference configuration, the ML module may be trained to map directional RF fingerprint features (e.g., inputs) captured from multiple TRPs over one UE's beam to a UE location (e.g., an output), where the captured RF fingerprint(s) and beam feature(s) from different TRPs may be passed to the ML module for the ML module training and inference. In some examples, the beam feature(s) may be included as an additional input. Also, the RF fingerprint features may also include RF fingerprints of different transmission-reception (Tx-Rx) antenna pairs (if available). For example, as shown at 1802, the ML module may receive multiple RF fingerprints (e.g., CIRs, CFRs, and/or normalized histograms, etc., of multiple antenna pairs) and one or more beam features (if available) from each of the TRPs for the ML module training and inference, and the ML module may map the multiple RF fingerprints and the one or more beam features (if available) from multiple TRPs to a position for the ML module training and inference.

Figure 19:
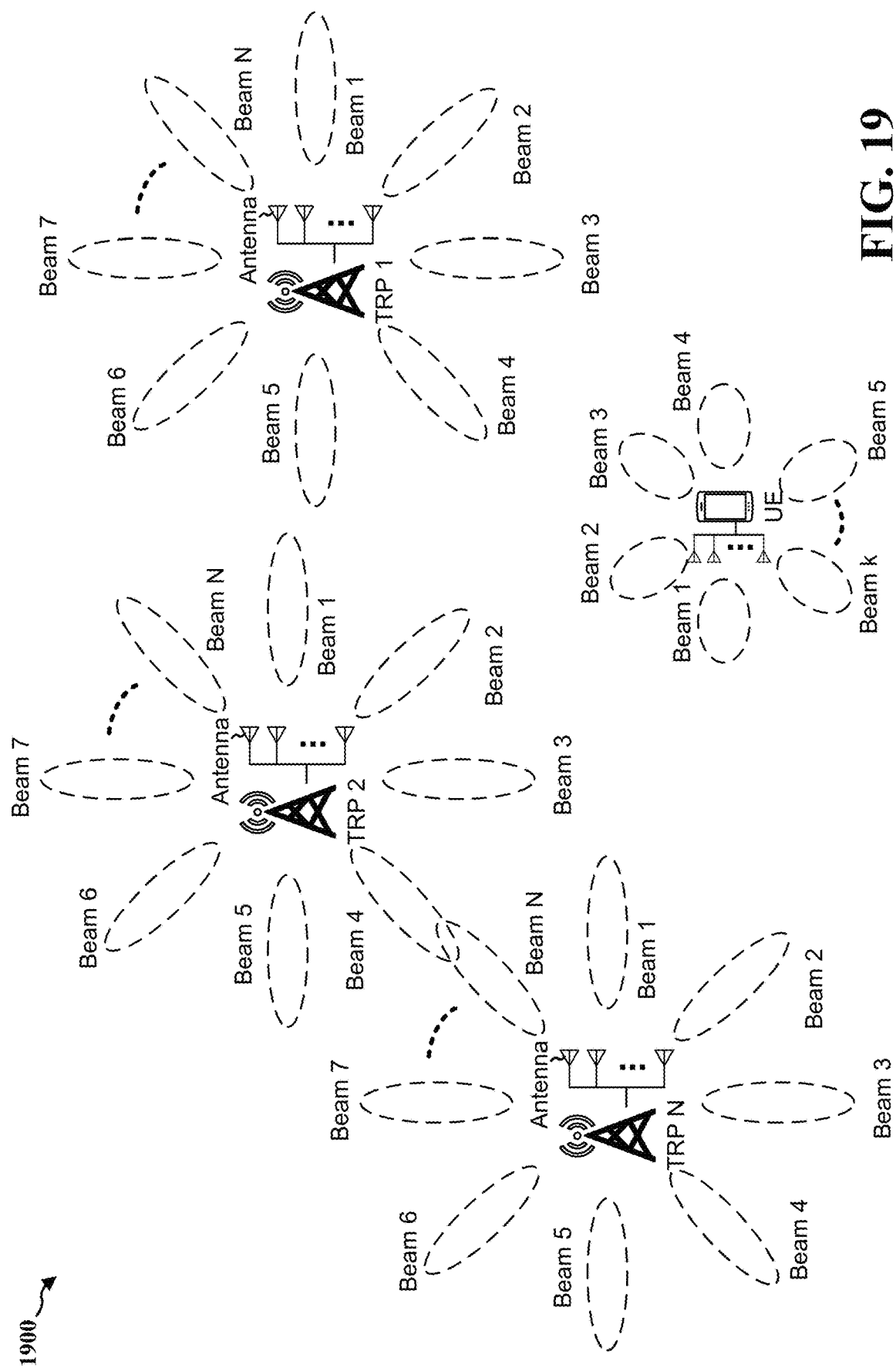
FIG. 19 is a diagram illustrating an example of an ML module training and inference based on multi-TRP beam sweeping in accordance with various aspects of the present disclosure.

FIG. 19 is a diagram 1900 illustrating an example of an ML module training and inference based on multi-TRP beam sweeping in accordance with various aspects of the present disclosure. In another aspect of the present disclosure, the inference of position may be based on beam-sweeping between a UE and multiple TRPs. For example, a UE may perform beam sweeping with each of the multiple TRPs and collect applicable RF fingerprints (e.g., CIRs, CFRs, and/or normalized histograms, etc.) and beam features (if available) that may be used as inputs for ML positioning. Then, based on the captured RF fingerprints and/or beam features from multiple TRPs, the UE may perform the inference if the ML module (e.g., the ML module 802) is at the UE side, or the UE may send the captured RF fingerprints and/or beam features back to the network (e.g., to a serving base station) to perform the inference if the ML module is at the network side. In some examples, the beam sweeping overhead may be reduced if the UE and/or the TRPs have the capability to activate multiple beams simultaneously. For example, if the TRPs have the capability to transmit the PRSs via multiple transmission beams at a time, and/or the UE has the capability to receive the PRSs via multiple reception beams at a time, the beam sweeping overhead used for the ML positioning may be reduced to improve positioning latency. As such, the ML module may be trained to map RF fingerprint features (e.g., inputs) captured from multiple TRPs over multiple swept beam pairs to a UE location (e.g., an output), where the captured RF fingerprints based on multiple sweep beams and beam feature(s) (if available) from the multiple TRPs may be passed to the ML module for the ML module training and inference. Similarly, beam feature(s) of the swept beams may be included as an additional input.

In one example, as shown by a diagram 2000A of FIG. 20A, the RF fingerprint feature(s) based on multi-TRP beam sweeping may include RF fingerprints (e.g., CIRs, CFRs, and/or normalized histograms, etc.) of different transmission-reception antenna pairs (if available) from each of the multiple TRPs (e.g., from a first TRP to an $N^{th}$ TRP). In another example, as shown by a diagram 2000B of FIG. 20B, the RF fingerprint feature(s) based on multi-TRP beam sweeping may include the sum (e.g., $\Sigma_i$) of RF fingerprints captured over swept beams from each of the multiple TRPs (e.g., from a first TRP to an $N^{th}$ TRP). Similarly, the swept beams may include a subset of transmission and/or reception beams.

Figure 21:
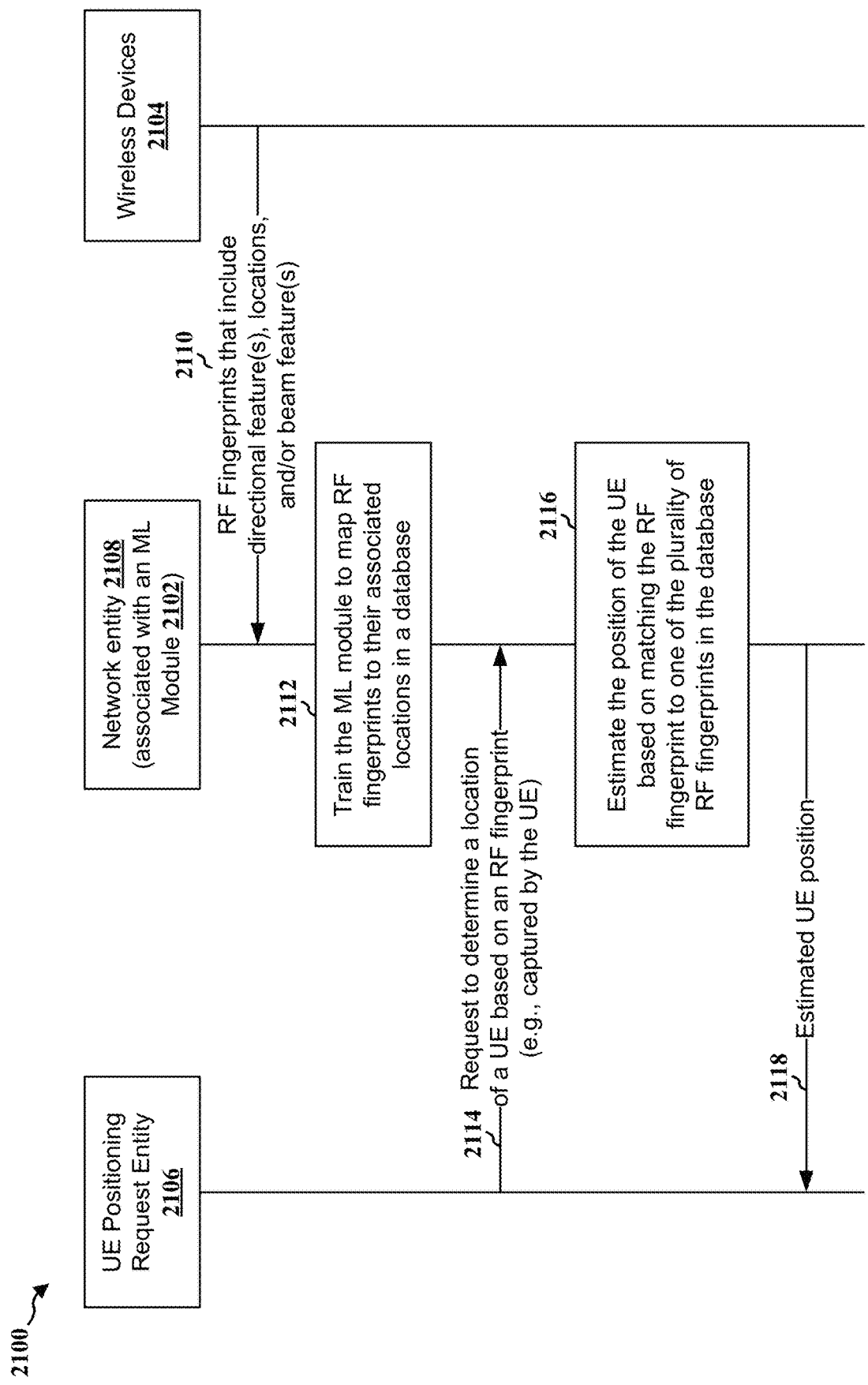
FIG. 21 is a communication flow illustrating an example of an ML module training and inference based on directional RF fingerprints in accordance with various aspects of the present disclosure.

FIG. 21 is a communication flow 2100 illustrating an example of an ML module training and inference based on directional RF fingerprints in accordance with various aspects of the present disclosure. The numberings associated with the communication flow 2100 do not specify a particular temporal order and are merely used as references for the communication flow 2100.

In one aspect, as shown at 2110, a network entity that is associated with an ML module 2102 may receive, from one or more wireless devices 2104, a plurality of RF fingerprints, where each of the plurality of RF fingerprints may be associated with at least one directional feature, a location, and/or at least one beam feature, such as described in connection with FIGS. 8 to 20. The network entity 2108 may be a UE, a location server, an LMF, a base station, etc. The ML module 2102 may be associated with a neural network, a deep neural network, or a random forest algorithm, etc. The one or more wireless devices 2104 may be UEs, TRPs, and/or other RF fingerprint capturing devices that are collecting RF fingerprints and their associated locations for the ML module 2102.

In one example, as described in connection with FIGS. 11A, 11B, and 11C, the at least one directional feature may correspond to a CIR or a CFR captured from a reference signal associated with UE positioning (e.g., a PRS or an SRS).

For example, as described in connection with FIGS. 9 and 10, the at least one directional feature may correspond to a CIR or a CFR captured at multiple antenna pairs, where each of the multiple antenna pairs may include a transmission antenna of a transmitting device and a reception antenna of a receiving device. In some examples, the at least one directional feature may correspond to at least one of a normalized histogram of received signal strength measured over a period of time or a range of frequency captured at multiple antenna pairs, each of the multiple antenna pairs may include a transmission antenna of a transmitting device and a reception antenna of a receiving device.

In another example, as described in connection with FIG. 10, the at least one directional feature may correspond to a complex-sum of CIR or CFR captured at multiple antenna pairs or multiple beam pairs, each of the multiple antenna pairs may include a transmission antenna of a transmitting device and a reception antenna of a receiving device and each of the multiple beam pairs may include a transmission beam of the transmitting device and a reception beam of the receiving device. In some examples, the at least one directional feature may correspond to at least one of a normalized histogram of received signal strength measured over a period of time or a range of frequency captured at multiple antenna pairs and multiple beam pairs, each of the multiple antenna pairs may include a transmission antenna of a transmitting device and a reception antenna of a receiving device and each of the multiple beam pairs may include a transmission beam of the transmitting device and a reception beam of the receiving device.

In another example, as described in connection with FIG. 10, the at least one directional feature may correspond to a compressed CIR or a compressed CFR captured at multiple antenna pairs or multiple beam pairs, where each of the multiple antenna pairs may include a transmission antenna of a transmitting device and a reception antenna of a receiving device and each of the multiple beam pairs may include a transmission beam of the transmitting device and a reception beam of the receiving device. In some examples, the at least one directional feature may correspond to at least one of a compressed normalized histogram of received signal strength measured over a period of time or a range of frequency captured at multiple antenna pairs and multiple beam pairs, each of the multiple antenna pairs may include a transmission antenna of a transmitting device and a reception antenna of a receiving device and each of the multiple beam pairs may include a transmission beam of the transmitting device and a reception beam of the receiving device.

In another example, as described in connection with FIG. 13, the at least one directional feature may correspond to one or more strongest CIRs or one or more strongest CFRs captured at multiple antenna pairs or multiple beam pairs, where each of the multiple antenna pairs may include a transmission antenna of a transmitting device and a reception antenna of a receiving device and each of the multiple beam pairs may include a transmission beam of the transmitting device and a reception beam of the receiving device. In some examples, the at least one directional feature may correspond to at least one of one or more strongest normalized histograms of received signal strength measured over a period of time or a range of frequency captured at multiple antenna pairs, each of the multiple antenna pairs may include a transmission antenna of a transmitting device and a reception antenna of a receiving device.

In some examples, the RF fingerprints may further be associated with at least one beam feature, such as described in connection with the beam features 806 of FIG. 8. As such, the position of the UE may be estimated further based at least in part on the at least one beam feature. In one example, the at least one beam feature may include one or more of: a beam shape, a CDF or a PDF of beam-based spherical EIRP measurements, a beam configuration, a beam measurement, or a beam embedding based on a GCN (e.g., as described in connection with FIG. 15). In addition, the at least one beam feature may be associated with at least one of a transmission beam at a transmitting device or a reception beam at a receiving device.

At 2112, the network entity 2108 or the ML module 2102 may be trained based on the plurality of RF fingerprints and their directional feature(s), associated locations, and/or associated beam feature(s) in a database to create a mapping between each of the plurality of RF fingerprints and at least one directional feature, location, and/or at least one beam feature. The mapping may also be stored in the database.

At 2114, the network entity 2108 or the ML module 2102 may receive a request from a UE positioning request entity 2106 that requests the ML module 2102 to determine the location of a UE based on an RF fingerprint associated with the UE or captured by the UE. In one example, the UE positioning request entity 2106 may be the UE itself, a serving base station of the UE, an LMF, and/or a location server, etc.

At 2116, the network entity 2108 or the ML module 2102 may estimate the position of the UE based on the mapping between the RF fingerprint and the associated directional feature(s), locations, and/or beam feature(s) obtained at

2112. For example, the ML module may estimate the position of the UE based at least in part on matching the RF fingerprint captured by the UE to at least one of the plurality of RF fingerprints in the database. The process of estimating the position of the UE may be referred to as an ML module inference or simply ML inference.

In one example, the ML inference and/or training may be based on one beam pair between one beam of the UE and one beam of a TRP, such as for the one-shot beam-based training and inference described in connection with FIG. 16. For example, the ML module 2102 may map one directional feature captured from one antenna pair to one location, where the one antenna pair may be associated with one TRP and one UE.

In another example, the ML inference and/or training may be based on a beam sweeping between one or more beams of the UE and one or more beams of a TRP, such as for the beam sweeping-based training and inference described in connection with FIG. 17. For example, the ML module 2102 may map multiple directional features captured from multiple swept beam pairs to one location, where the multiple swept beam pairs may be associated with one TRP and one UE.

Figure 20:
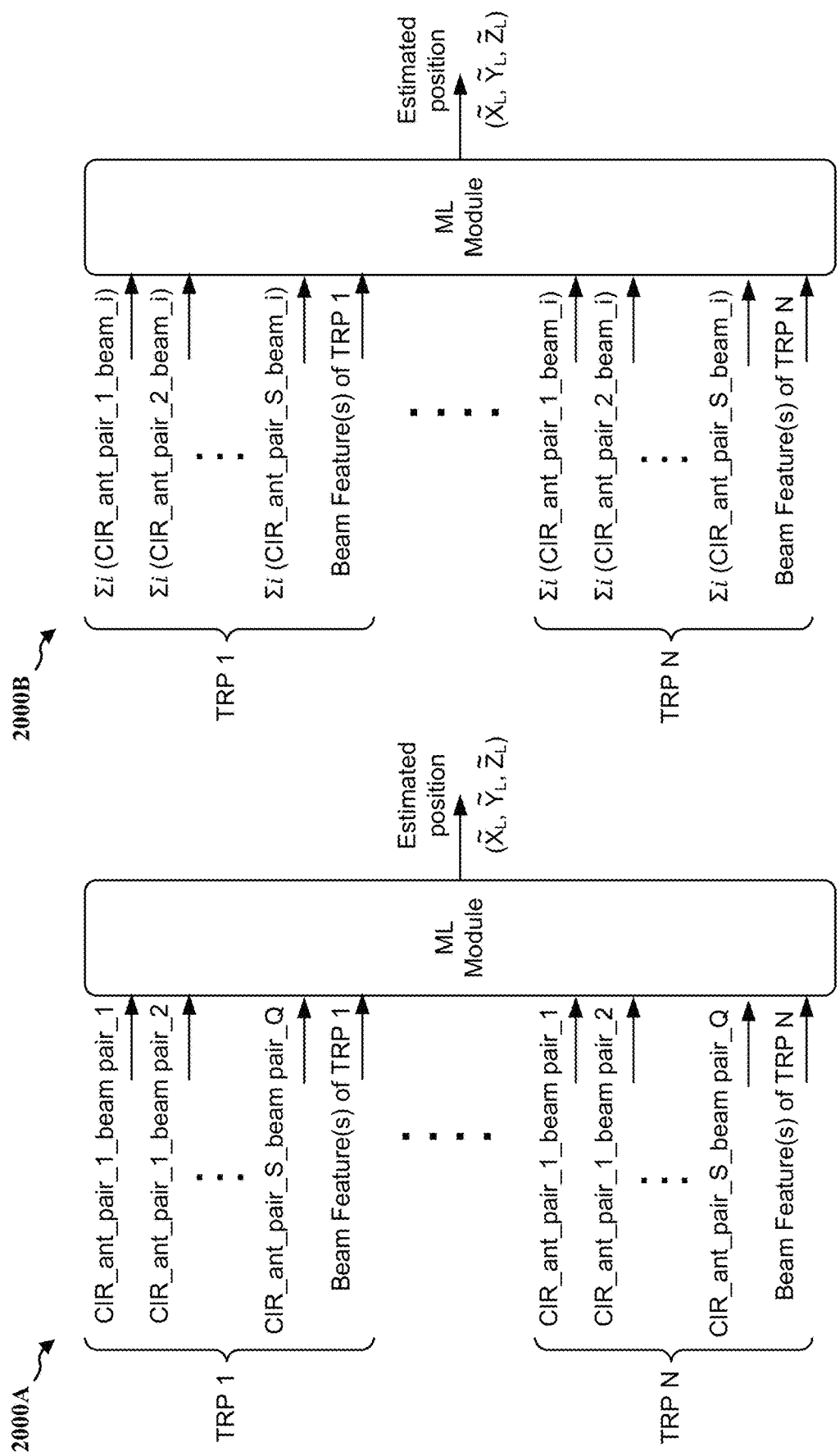
FIG. 20A is a diagram illustrating an example RF fingerprint feature(s) based on multi-TRP beam sweeping in accordance with various aspects of the present disclosure.
FIG. 20B is a diagram illustrating an example RF fingerprint feature(s) based on multi-TRP beam sweeping in accordance with various aspects of the present disclosure.

In some examples, as described in connection with FIGS. 18 to 20. the ML inference and training may be captured from or based on multiple beam pairs to one location, where the multiple beam pairs may be associated with one UE and multiple TRPs. For example, the ML inference and training module may map multiple directional features captured from multiple swept beam pairs to one location, where the multiple swept beam pairs may be associated with one UE and multiple TRPs.

At 2118, the network entity 2108 or the ML module may report the estimated positioning for the UE to the UE positioning request entity 2106.

Figure 22:
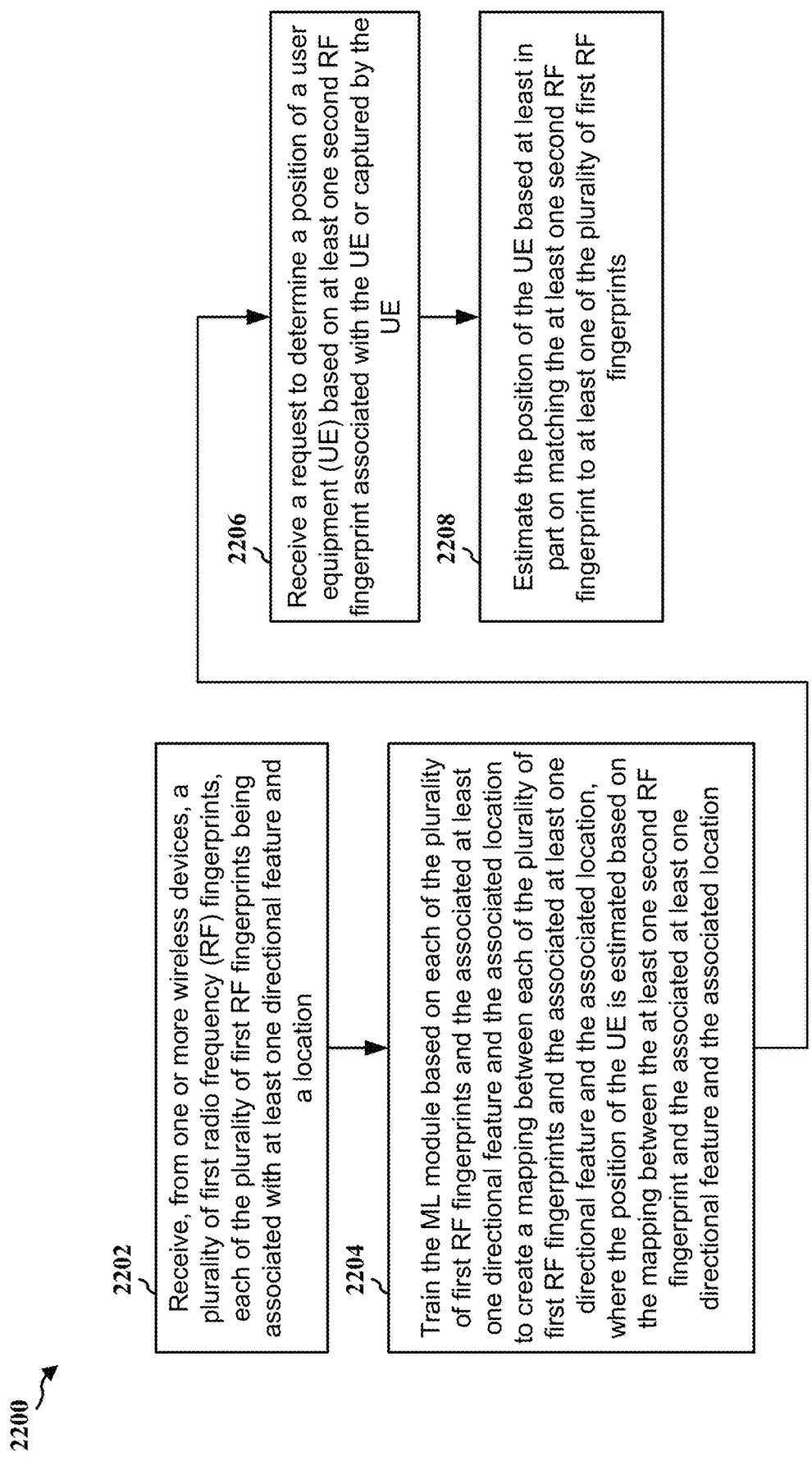
FIG. 22 is a flowchart of a method of wireless communication in accordance with aspects presented herein.

FIG. 22 is a flowchart 2200 of a method of wireless communication. The method may be performed by a network entity or a component of a network entity (e.g., the base station 102, 180, 310; the UE 104, 350, 404, 602; the TRP 402, 604, 606, 608, 610; the ML module 2102; 803; the apparatus 2402). The method may enable the network entity to associate RF fingerprints with directional features and/or beam features to improve UE positioning based on RF fingerprinting.

At 2202, the network entity may receive, from one or more wireless devices, a plurality of first RF fingerprints, each of the plurality of first RF fingerprints may be associated with at least one directional feature and a location, such as described in connection with FIG. 21. For example, at 2110, a network entity 2108 that is associated with an ML module 2102 may receive, from one or more wireless devices 2104, a plurality of first RF fingerprints, each of the plurality of first RF fingerprints may be associated with at least one directional feature and a location. The reception of the plurality of first RF fingerprints may be performed by, e.g., the RF fingerprints process component 2440 and/or the reception component 2430 of the apparatus 2402 in FIG. 24.

In one example, the at least one directional feature may correspond to a CIR or a CFR captured from a PRS or an SRS.

In another example, the at least one directional feature may correspond to a CIR or a CFR captured at multiple antenna pairs, each of the multiple antenna pairs may include a transmission antenna of a transmitting device and a reception antenna of a receiving device.

In another example, the at least one directional feature may correspond to at least one of a normalized histogram of received signal strength measured over a period of time or a range of frequency captured at multiple antenna pairs, each of the multiple antenna pairs may include a transmission antenna of a transmitting device and a reception antenna of a receiving device.

In another example, the at least one directional feature may correspond to a complex-sum of CIR or CFR captured at multiple antenna pairs or multiple beam pairs, each of the multiple antenna pairs may include a transmission antenna of a transmitting device and a reception antenna of a receiving device and each of the multiple beam pairs may include a transmission beam of the transmitting device and a reception beam of the receiving device.

In another example, the at least one directional feature may correspond to at least one of a normalized histogram of received signal strength measured over a period of time or a range of frequency captured at multiple antenna pairs and multiple beam pairs, each of the multiple antenna pairs may include a transmission antenna of a transmitting device and a reception antenna of a receiving device and each of the multiple beam pairs may include a transmission beam of the transmitting device and a reception beam of the receiving device.

In another example, the at least one directional feature may correspond to a compressed CIR or a compressed CFR captured at multiple antenna pairs or multiple beam pairs, each of the multiple antenna pairs may include a transmission antenna of a transmitting device and a reception antenna of a receiving device and each of the multiple beam pairs may include a transmission beam of the transmitting device and a reception beam of the receiving device.

In another example, the at least one directional feature may correspond to at least one of a compressed normalized histogram of received signal strength measured over a period of time or a range of frequency captured at multiple antenna pairs and multiple beam pairs, each of the multiple antenna pairs may include a transmission antenna of a transmitting device and a reception antenna of a receiving device and each of the multiple beam pairs may include a transmission beam of the transmitting device and a reception beam of the receiving device.

In another example, the at least one directional feature may correspond to one or more strongest CIRs or one or more strongest CFRs captured at multiple antenna pairs or multiple beam pairs, each of the multiple antenna pairs may include a transmission antenna of a transmitting device and a reception antenna of a receiving device and each of the multiple beam pairs may include a transmission beam of the transmitting device and a reception beam of the receiving device.

In another example, the at least one directional feature may correspond to at least one of one or more strongest normalized histograms of received signal strength measured over a period of time or a range of frequency captured at multiple antenna pairs, each of the multiple antenna pairs may include a transmission antenna of a transmitting device and a reception antenna of a receiving device.

In another example, each of the plurality of first RF fingerprints may further be associated with at least one beam feature, and the position of the UE may be estimated further based at least in part on the at least one beam feature. In such an example, the at least one beam feature may include one or more of: a beam shape, a CDF or a PDF of beam-based spherical EIRP measurements, a beam configuration, a beam measurement, or a beam embedding based on a GCN. In such an example, the at least one beam feature may be associated with at least one of a transmission beam at a transmitting device or a reception beam at a receiving device.

In another example, the network entity may be a location server, the UE, or a base station associated with ML module. In such an example, the ML module may be associated with an NN, a deep NN, or a random forest algorithm.

At 2204, the network entity may train the ML module based on each of the plurality of first RF fingerprints and the associated at least one directional feature and the associated location to create a mapping between each of the plurality of first RF fingerprints and the associated at least one directional feature and the associated location, where the position of the UE is estimated based on the mapping between the at least one second RF fingerprint and the associated at least one directional feature and the associated location, such as described in connection with FIG. 21. For example, at 2112, the network entity 2108 may train the ML module 2102 based on the plurality of RF fingerprints and the associated directional feature and the associated location to create a mapping between each of the plurality of RF fingerprints and the associated directional feature and the associated location. The training of the ML module may be performed by, e.g., the ML module training component 2446 of the apparatus 2402 in FIG. 24.

At 2206, the network entity may receive a request to determine a position of a UE based on at least one second RF fingerprint associated with the UE or captured by the UE, such as described in connection with FIG. 21. For example, the network entity 2108 or the ML module 2102 may receive a request from a UE positioning request entity to determine a position of a UE based on at least one RF fingerprint captured by the UE. The reception of the request to determine a position of a UE may be performed by, e.g., the position request process component 2442 and/or the reception component 2430.

At 2208, the network entity may estimate the position of the UE based at least in part on matching the at least one second RF fingerprint to at least one of the plurality of first RF fingerprints, such as described in connection with FIG. 10. For example, at 2116, the network entity 2108 may estimate the position of a UE based at least in part on matching the at least one RF fingerprint to one of the RF fingerprints in the database. The estimation of the position of the UE may be performed by, e.g., the position inference component 2444 of the apparatus 2402 in FIG. 24.

In one example, the at least one second RF fingerprint associated with the UE may be based on one beam pair between one beam of the UE and one beam of a TRP.

In another example, the at least one second RF fingerprint associated with the UE may be based on a beam sweeping between one or more beams of the UE and one or more beams of a TRP.

In another example, the network entity may be associated with an ML module, and the network entity may train the ML module to map one directional feature captured from one antenna pair to one location, the one antenna pair being associated with one TRP and one UE.

In another example, the network entity is associated with an ML module, and the network entity may train the ML module to map multiple directional features captured from multiple swept beam pairs to one location, the multiple swept beam pairs being associated with one TRP and one UE.

In another example, the network entity is associated with an ML module, and the network entity may train the ML module to map multiple directional features captured from multiple beam pairs to one location, the multiple beam pairs being associated with one UE and multiple TRPs.

In another example, the network entity is associated with an ML module, and the network entity may train the ML module to map multiple directional features captured from multiple swept beam pairs to one location, the multiple swept beam pairs being associated with one UE and multiple TRPs.

Figure 23:
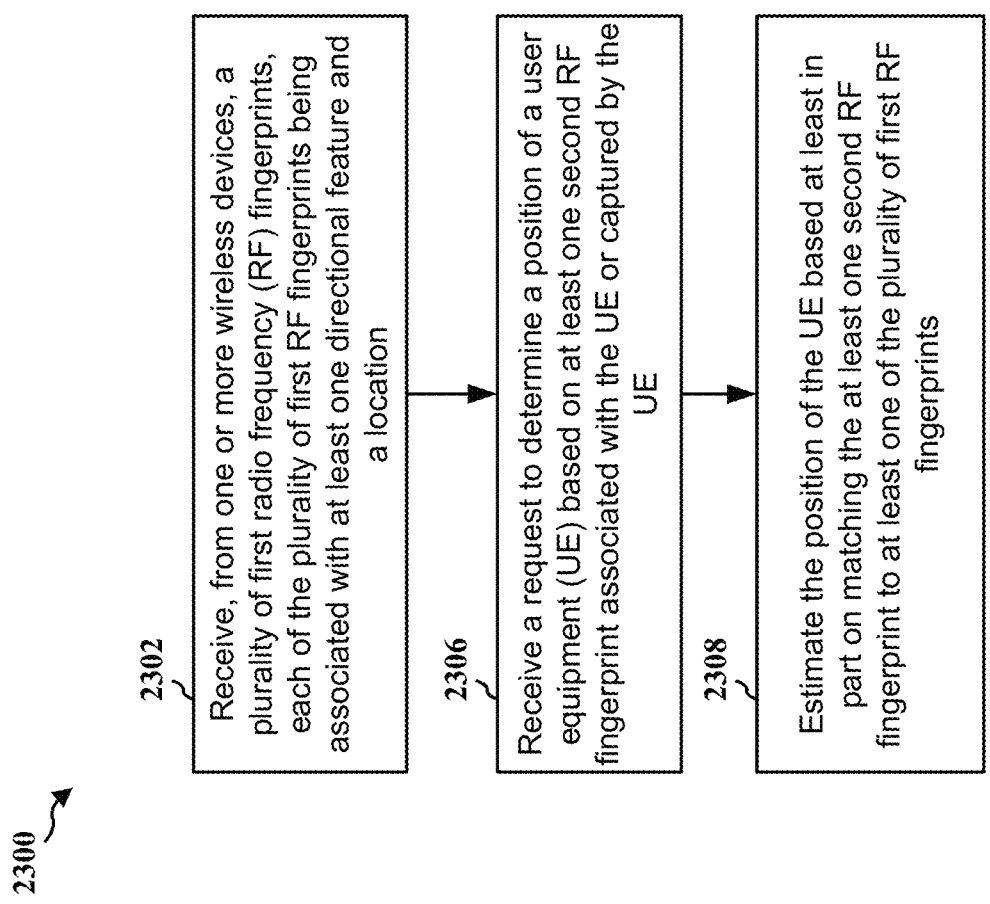
FIG. 23 is a flowchart of a method of wireless communication in accordance with aspects presented herein.

FIG. 23 is a flowchart 2300 of a method of wireless communication. The method may be performed by a network entity or a component of a network entity (e.g., the base station 102, 180, 310; the UE 104, 350, 404, 602; the TRP 402, 604, 606, 608, 610; the ML module 2102; 803; the apparatus 2402). The method may enable the network entity to associate RF fingerprints with directional features and/or beam features to improve UE positioning based on RF fingerprinting.

At 2302, the network entity may receive, from one or more wireless devices, a plurality of first RF fingerprints, each of the plurality of first RF fingerprints may be associated with at least one directional feature and a location, such as described in connection with FIG. 21. For example, at 2110, a network entity 2108 that is associated with an ML module 2102 may receive, from one or more wireless devices 2104, a plurality of first RF fingerprints, each of the plurality of first RF fingerprints may be associated with at least one directional feature and a location. The reception of the plurality of first RF fingerprints may be performed by, e.g., the RF fingerprints process component 2440 and/or the reception component 2430 of the apparatus 2402 in FIG. 24.

In one example, the at least one directional feature may correspond to a CIR or a CFR captured from a PRS or an SRS.

In another example, the at least one directional feature may correspond to a CIR or a CFR captured at multiple antenna pairs, each of the multiple antenna pairs may include a transmission antenna of a transmitting device and a reception antenna of a receiving device.

In another example, the at least one directional feature may correspond to at least one of a normalized histogram of received signal strength measured over a period of time or a range of frequency captured at multiple antenna pairs, each of the multiple antenna pairs may include a transmission antenna of a transmitting device and a reception antenna of a receiving device.

In another example, the at least one directional feature may correspond to a complex-sum of CIR or CFR captured at multiple antenna pairs or multiple beam pairs, each of the multiple antenna pairs may include a transmission antenna of a transmitting device and a reception antenna of a receiving device and each of the multiple beam pairs may include a transmission beam of the transmitting device and a reception beam of the receiving device.

In another example, the at least one directional feature may correspond to at least one of a normalized histogram of received signal strength measured over a period of time or a range of frequency captured at multiple antenna pairs and multiple beam pairs, each of the multiple antenna pairs may include a transmission antenna of a transmitting device and a reception antenna of a receiving device and each of the multiple beam pairs may include a transmission beam of the transmitting device and a reception beam of the receiving device.

In another example, the at least one directional feature may correspond to a compressed CIR or a compressed CFR captured at multiple antenna pairs or multiple beam pairs, each of the multiple antenna pairs may include a transmission antenna of a transmitting device and a reception antenna of a receiving device and each of the multiple beam pairs may include a transmission beam of the transmitting device and a reception beam of the receiving device.

In another example, the at least one directional feature may correspond to at least one of a compressed normalized histogram of received signal strength measured over a period of time or a range of frequency captured at multiple antenna pairs and multiple beam pairs, each of the multiple antenna pairs may include a transmission antenna of a transmitting device and a reception antenna of a receiving device and each of the multiple beam pairs may include a transmission beam of the transmitting device and a reception beam of the receiving device.

In another example, the at least one directional feature may correspond to one or more strongest CIRs or one or more strongest CFRs captured at multiple antenna pairs or multiple beam pairs, each of the multiple antenna pairs may include a transmission antenna of a transmitting device and a reception antenna of a receiving device and each of the multiple beam pairs may include a transmission beam of the transmitting device and a reception beam of the receiving device.

In another example, the at least one directional feature may correspond to at least one of one or more strongest normalized histograms of received signal strength measured over a period of time or a range of frequency captured at multiple antenna pairs, each of the multiple antenna pairs may include a transmission antenna of a transmitting device and a reception antenna of a receiving device.

In another example, each of the plurality of first RF fingerprints may further be associated with at least one beam feature, and the position of the UE may be estimated further based at least in part on the at least one beam feature. In such an example, the at least one beam feature may include one or more of: a beam shape, a CDF or a PDF of beam-based spherical EIRP measurements, a beam configuration, a beam measurement, or a beam embedding based on a GCN. In such an example, the at least one beam feature may be associated with at least one of a transmission beam at a transmitting device or a reception beam at a receiving device.

In another example, the network entity may be a location server, the UE, or a base station associated with ML module. In such an example, the ML module may be associated with an NN, a deep NN, or a random forest algorithm. In such an example, the network entity may train the ML module based on each of the plurality of first RF fingerprints and the associated at least one directional feature and the associated location to create a mapping between each of the plurality of first RF fingerprints and the associated at least one directional feature and the associated location, where the position of the UE is estimated based on the mapping between the at least one second RF fingerprint and the associated at least one directional feature and the associated location, such as described in connection with FIG. 21. For example, at 2112, the network entity 2108 may train the ML module 2102 based on the plurality of RF fingerprints and the associated directional feature and the associated location to create a mapping between each of the plurality of RF fingerprints and the associated directional feature and the associated location. The training of the ML module may be performed by, e.g., the ML module training component 2446 of the apparatus 2402 in FIG. 24.

At 2306, the network entity may receive a request to determine a position of a UE based on at least one second RF fingerprint associated with the UE or captured by the UE, such as described in connection with FIG. 21. For example, the network entity 2108 or the ML module 2102 may receive a request from a UE positioning request entity to determine a position of a UE based on at least one RF fingerprint captured by the UE. The reception of the request to determine a position of a UE may be performed by, e.g., the position request process component 2442 and/or the reception component 2430.

At 2308, the network entity may estimate the position of the UE based at least in part on matching the at least one second RF fingerprint to at least one of the plurality of first RF fingerprints, such as described in connection with FIG. 10. For example, at 2116, the network entity 2108 may estimate the position of a UE based at least in part on matching the at least one RF fingerprint to one of the RF fingerprints in the database. The estimation of the position of the UE may be performed by, e.g., the position inference component 2444 of the apparatus 2402 in FIG. 24.

In one example, the at least one second RF fingerprint associated with the UE may be based on one beam pair between one beam of the UE and one beam of a TRP.

In another example, the at least one second RF fingerprint associated with the UE may be based on a beam sweeping between one or more beams of the UE and one or more beams of a TRP.

In another example, the network entity may be associated with an ML module, and the network entity may train the ML module to map one directional feature captured from one antenna pair to one location, the one antenna pair being associated with one TRP and one UE.

In another example, the network entity is associated with an ML module, and the network entity may train the ML module to map multiple directional features captured from multiple swept beam pairs to one location, the multiple swept beam pairs being associated with one TRP and one UE.

In another example, the network entity is associated with an ML module, and the network entity may train the ML module to map multiple directional features captured from multiple beam pairs to one location, the multiple beam pairs being associated with one UE and multiple TRPs.

In another example, the network entity is associated with an ML module, and the network entity may train the ML module to map multiple directional features captured from multiple swept beam pairs to one location, the multiple swept beam pairs being associated with one UE and multiple TRPs.

Figure 24:
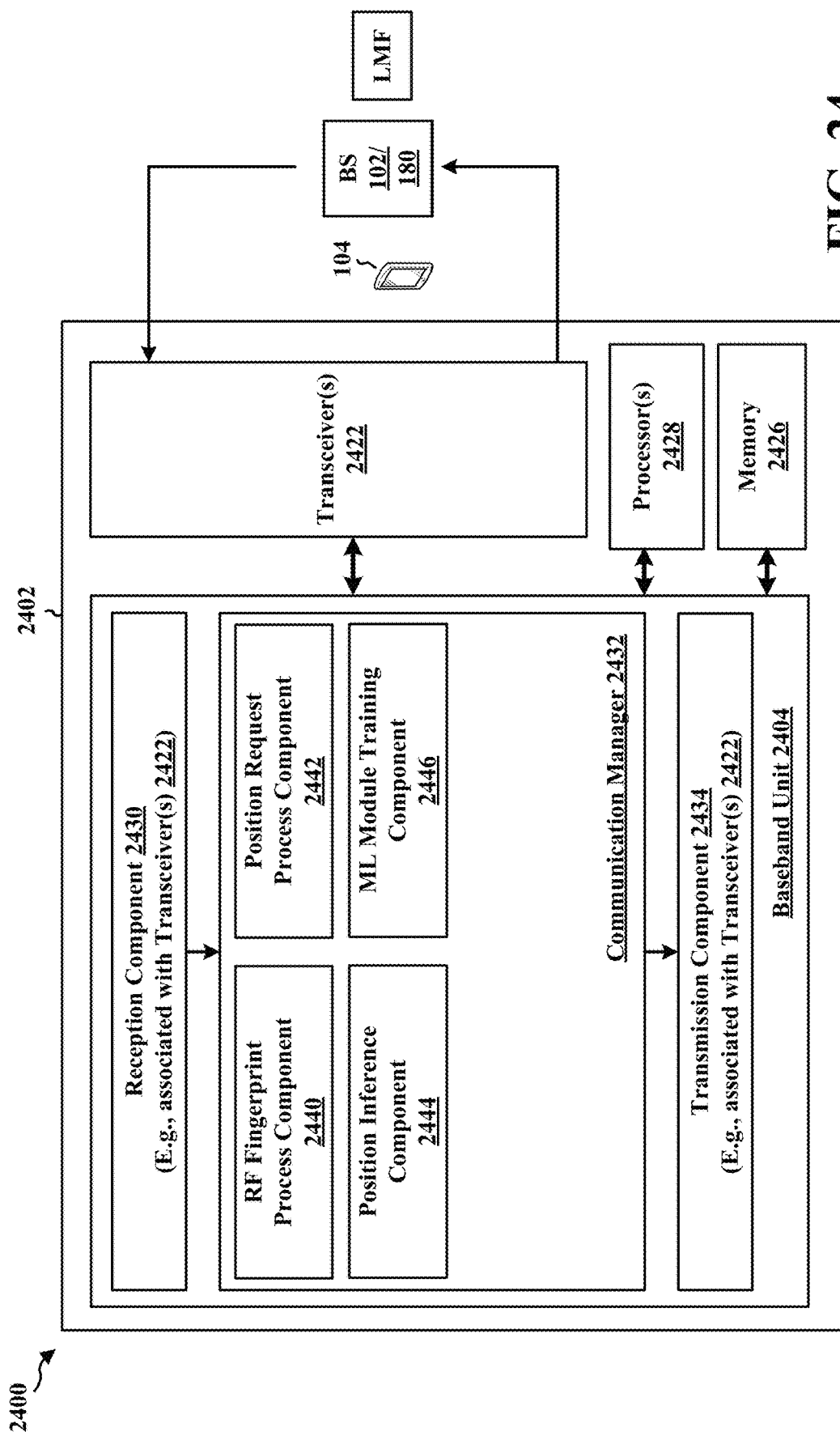
FIG. 24 is a diagram illustrating an example of a hardware implementation for an example apparatus in accordance with aspects presented herein.

FIG. 24 is a diagram 2400 illustrating an example of a hardware implementation for an apparatus 2402. The apparatus 2402 may be a network entity, a component of a network entity, or may implement network entity functionality. In some aspects, the apparatus 2402 may include a baseband unit 2404. The baseband unit 2404 may communicate through at least one transceiver 2422 (e.g., one or more RF transceivers and/or antennas) with the UE 104, the base station 102/180, an LMF, and/or a location server. The at least one transceiver 2422 may be associated with or include a reception component 2430 and/or a transmission component 2434. The baseband unit 2404 may include a computer-readable medium/memory (e.g., a memory 2426). The baseband unit 2404 and/or the at least one processor 2428 may be responsible for general processing, including the execution of software stored on the computer-readable medium/memory. The software, when executed by the baseband unit 2404 and/or the at least one processor 2428, causes the baseband unit 2404 and/or the at least one processor 2428 to perform the various functions described supra. The computer-readable medium/memory may also be used for storing data that is manipulated by the baseband unit 2404 when executing software. The baseband unit 2404 further includes the reception component 2430, a communication manager 2432, and the transmission component 2434. The reception component 2430 and the transmission component 2434 may, in a non-limiting example, include at least one transceiver and/or at least one antenna subsystem. The communication manager 2432 includes the one or more illustrated components. The components within the communication manager 2432 may be stored in the computer-readable medium/memory and/or configured as hardware within the baseband unit 2404. The baseband unit 2404 may be a component of the network entity and may include the memory 376 and/or at least one of the TX processor 316, the RX processor 370, and the controller/processor 375.

The communication manager 2432 includes an RF fingerprint process component 2440 that receives, from one or more wireless devices, a plurality of first RF fingerprints, each of the plurality of first RF fingerprints being associated with at least one directional feature and a location, e.g., as described in connection with 2202 of FIGS. 22 and/or 2302 of FIG. 23. The communication manager 2432 further includes an ML module training component 2446 that trains the ML module based on each of the plurality of first RF fingerprints and the associated at least one directional feature and the associated location to create a mapping between each of the plurality of first RF fingerprints and the associated at least one directional feature and the associated location, where the position of the UE is estimated based on the mapping between the at least one second RF fingerprint and the associated at least one directional feature and the associated location, e.g., as described in connection with 2204 of FIG. 22. The communication manager 2432 further includes a position request process component 2442 that receives a request to determine a position of a UE based on at least one second RF fingerprint associated with the UE or captured by the UE, e.g., as described in connection with 2206 of FIGS. 22 and/or 2306 of FIG. 23. The communication manager 2432 further includes a position inference component 2444 that estimates the position of the UE based at least in part on matching the at least one second RF fingerprint to at least one of the plurality of first RF fingerprints, e.g., as described in connection with 2208 of FIGS. 22 and/or 2308 of FIG. 23.

The apparatus may include additional components that perform each of the blocks of the algorithm in the flowcharts of FIGS. 22 and 23. As such, each block in the flowcharts of FIGS. 22 and 23 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2402 may include a variety of components configured for various functions. In one configuration, the apparatus 2402, and in particular the baseband unit 2404, includes means for receiving, from one or more wireless devices, a plurality of first RF fingerprints, each of the plurality of first RF fingerprints being associated with at least one directional feature and a location (e.g., the RF fingerprints process component 2440 and/or the reception component 2430). The apparatus 2402 includes means for receiving a request to determine a position of a UE based on at least one second RF fingerprint associated with the UE or captured by the UE (e.g., the position request process component 2442 and/or the reception component 2430). The apparatus 2402 includes means for estimating the position of the UE based at least in part on matching the at least one second RF fingerprint to at least one of the plurality of first RF fingerprints (e.g., the position inference component 2444). The apparatus 2402 includes means for training the ML module based on each of the plurality of first RF fingerprints and the associated at least one directional feature and the associated location to create a mapping between each of the plurality of first RF fingerprints and the associated at least one directional feature and the associated location, where the position of the UE is estimated based on the mapping between the at least one second RF fingerprint and the associated at least one directional feature and the associated location (e.g., the ML module training component 2446).

In one configuration, the at least one directional feature may correspond to a CIR or a CFR captured from a PRS or an SRS.

In another configuration, the at least one directional feature may correspond to a CIR or a CFR captured at multiple antenna pairs, each of the multiple antenna pairs may include a transmission antenna of a transmitting device and a reception antenna of a receiving device.

In another configuration, the at least one directional feature may correspond to at least one of a normalized histogram of received signal strength measured over a period of time or a range of frequency captured at multiple antenna pairs, each of the multiple antenna pairs may include a transmission antenna of a transmitting device and a reception antenna of a receiving device.

In another configuration, the at least one directional feature may correspond to a complex-sum of CIR or CFR captured at multiple antenna pairs or multiple beam pairs, each of the multiple antenna pairs may include a transmission antenna of a transmitting device and a reception antenna of a receiving device and each of the multiple beam pairs may include a transmission beam of the transmitting device and a reception beam of the receiving device.

In another configuration, the at least one directional feature may correspond to at least one of a normalized histogram of received signal strength measured over a period of time or a range of frequency captured at multiple antenna pairs and multiple beam pairs, each of the multiple antenna pairs may include a transmission antenna of a transmitting device and a reception antenna of a receiving device and each of the multiple beam pairs may include a transmission beam of the transmitting device and a reception beam of the receiving device.

In another configuration, the at least one directional feature may correspond to a compressed CIR or a compressed CFR captured at multiple antenna pairs or multiple beam pairs, each of the multiple antenna pairs may include a transmission antenna of a transmitting device and a reception antenna of a receiving device and each of the multiple beam pairs may include a transmission beam of the transmitting device and a reception beam of the receiving device.

In another configuration, the at least one directional feature may correspond to at least one of a compressed normalized histogram of received signal strength measured over a period of time or a range of frequency captured at multiple antenna pairs and multiple beam pairs, each of the multiple antenna pairs may include a transmission antenna of a transmitting device and a reception antenna of a receiving device and each of the multiple beam pairs may include a transmission beam of the transmitting device and a reception beam of the receiving device.

In another configuration, the at least one directional feature may correspond to one or more strongest CIRs or one or more strongest CFRs captured at multiple antenna pairs or multiple beam pairs, each of the multiple antenna pairs may include a transmission antenna of a transmitting device and a reception antenna of a receiving device and each of the multiple beam pairs may include a transmission beam of the transmitting device and a reception beam of the receiving device.

In another configuration, the at least one directional feature may correspond to at least one of one or more strongest normalized histograms of received signal strength measured over a period of time or a range of frequency captured at multiple antenna pairs, each of the multiple antenna pairs may include a transmission antenna of a transmitting device and a reception antenna of a receiving device.

In another configuration, each of the plurality of first RF fingerprints may further be associated with at least one beam feature, and the position of the UE may be estimated further based at least in part on the at least one beam feature. In such a configuration, the at least one beam feature may include one or more of: a beam shape, a CDF or a PDF of beam-based spherical EIRP measurements, a beam configuration, a beam measurement, or a beam embedding based on a GCN. In such a configuration, the at least one beam feature may be associated with at least one of a transmission beam at a transmitting device or a reception beam at a receiving device.

In another configuration, the network entity may be a location server, the UE, or a base station associated with ML module. In such a configuration, the ML module may be associated with an NN, a deep NN, or a random forest algorithm.

In another configuration, the at least one second RF fingerprint associated with the UE may be based on one beam pair between one beam of the UE and one beam of a TRP.

In another configuration, the at least one second RF fingerprint associated with the UE may be based on a beam sweeping between one or more beams of the UE and one or more beams of a TRP.

In another configuration, the network entity may be associated with an ML module, and the network entity may train the ML module to map one directional feature captured from one antenna pair to one location, the one antenna pair being associated with one TRP and one UE.

In another configuration, the network entity is associated with an ML module, and the network entity may train the ML module to map multiple directional features captured from multiple swept beam pairs to one location, the multiple swept beam pairs being associated with one TRP and one UE.

In another configuration, the network entity is associated with an ML module, and the network entity may train the ML module to map multiple directional features captured from multiple beam pairs to one location, the multiple beam pairs being associated with one UE and multiple TRPs.

In another configuration, the network entity is associated with an ML module, and the network entity may train the ML module to map multiple directional features captured from multiple swept beam pairs to one location, the multiple swept beam pairs being associated with one UE and multiple TRPs.

The means may be one or more of the components of the apparatus 2402 configured to perform the functions recited by the means. As described supra, the apparatus 2402 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including a memory; at least one transceiver; and at least one processor communicatively connected to the memory and the at least one transceiver, the at least one processor configured to: receive, from one or more wireless devices, a plurality of first RF fingerprints, each of the plurality of first RF fingerprints being associated with at least one directional feature and a location; receive a request to determine a position of a UE based on at least one second RF fingerprint associated with the UE or captured by the UE; and estimate the position of the UE based at least in part on matching the at least one second RF fingerprint to at least one of the plurality of first RF fingerprints.

Aspect 2 is the apparatus of aspect 1, where the network entity is a location server, the UE, or a base station associated with ML module.

Aspect 3 is the apparatus of any of aspects 1 and 2, where the ML module is associated with an NN, a deep NN, or a random forest algorithm.

Aspect 4 is the apparatus of any of aspects 1 to 3, where the at least one processor is further configured to: train the ML module based on each of the plurality of first RF fingerprints and the associated at least one directional feature and the associated location to create a mapping between each of the plurality of first RF fingerprints and the associated at least one directional feature and the associated location, where the position of the UE is estimated based on the mapping between the at least one second RF fingerprint and the associated at least one directional feature and the associated location.

Aspect 5 is the apparatus of any of aspects 1 to 4, where the request is received from the UE, a location server, or a base station.

Aspect 6 is the apparatus of any of aspects 1 to 5, where the at least one directional feature corresponds to a CIR or a CFR captured from a PRS or an SRS.

Aspect 7 is the apparatus of any of aspects 1 to 6, where the at least one directional feature corresponds to a CIR or a CFR captured at multiple antenna pairs, each of the multiple antenna pairs including a transmission antenna of a transmitting device and a reception antenna of a receiving device.

Aspect 8 is the apparatus of any of aspects 1 to 7, where the at least one directional feature corresponds to at least one of a normalized histogram of received signal strength measured over a period of time or a range of frequency captured at multiple antenna pairs, each of the multiple antenna pairs including a transmission antenna of a transmitting device and a reception antenna of a receiving device.

Aspect 9 is the apparatus of any of aspects 1 to 8, where the at least one directional feature corresponds to a complex-sum of CIR or CFR captured at multiple antenna pairs or multiple beam pairs, each of the multiple antenna pairs including a transmission antenna of a transmitting device and a reception antenna of a receiving device and each of the multiple beam pairs including a transmission beam of the transmitting device and a reception beam of the receiving device.

Aspect 10 is the apparatus of any of aspects 1 to 9, where the at least one directional feature corresponds to at least one of a normalized histogram of received signal strength measured over a period of time or a range of frequency captured at multiple antenna pairs and multiple beam pairs, each of the multiple antenna pairs including a transmission antenna of a transmitting device and a reception antenna of a receiving device and each of the multiple beam pairs including a transmission beam of the transmitting device and a reception beam of the receiving device.

Aspect 11 is the apparatus of any of aspects 1 to 10, the at least one directional feature corresponds to a compressed CIR or a compressed CFR captured at multiple antenna pairs or multiple beam pairs, each of the multiple antenna pairs including a transmission antenna of a transmitting device and a reception antenna of a receiving device and each of the multiple beam pairs including a transmission beam of the transmitting device and a reception beam of the receiving device.

Aspect 12 is the apparatus of any of aspects 1 to 11, where the at least one directional feature corresponds to at least one of a compressed normalized histogram of received signal strength measured over a period of time or a range of frequency captured at multiple antenna pairs and multiple beam pairs, each of the multiple antenna pairs including a transmission antenna of a transmitting device and a reception antenna of a receiving device and each of the multiple beam pairs including a transmission beam of the transmitting device and a reception beam of the receiving device.

Aspect 13 is the apparatus of any of aspects 1 to 12, where the at least one directional feature corresponds to one or more strongest CIRs or one or more strongest CFRs captured at multiple antenna pairs or multiple beam pairs, each of the multiple antenna pairs including a transmission antenna of a transmitting device and a reception antenna of a receiving device and each of the multiple beam pairs including a transmission beam of the transmitting device and a reception beam of the receiving device.

Aspect 14 is the apparatus of any of aspects 1 to 13, where the at least one directional feature corresponds to at least one of one or more strongest normalized histograms of received signal strength measured over a period of time or a range of frequency captured at multiple antenna pairs, each of the multiple antenna pairs including a transmission antenna of a transmitting device and a reception antenna of a receiving device.

Aspect 15 is the apparatus of any of aspects 1 to 14, where each of the plurality of first RF fingerprints is further associated with at least one beam feature, and where the position of the UE is estimated further based at least in part on the at least one beam feature.

Aspect 16 is the apparatus of any of aspects 1 to 15, where the at least one beam feature includes one or more of: a beam shape, a CDF or a PDF of beam-based spherical EIRP measurements, a beam configuration, a beam measurement, or a beam embedding based on a GCN.

Aspect 17 is the apparatus of any of aspects 1 to 16, where the at least one beam feature is associated with at least one of a transmission beam at a transmitting device or a reception beam at a receiving device.

Aspect 18 is the apparatus of any of aspects 1 to 17, where the at least one second RF fingerprint associated with the UE is based on one beam pair between one beam of the UE and one beam of a TRP.

Aspect 19 is the apparatus of any of aspects 1 to 18, where the at least one second RF fingerprint associated with the UE is based on a beam sweeping between one or more beams of the UE and one or more beams of a TRP.

Aspect 20 is the apparatus of any of aspects 1 to 19, where the network entity is associated with an ML module, and the at least one processor is further configured to: train the ML module to map one directional feature captured from one antenna pair to one location, the one antenna pair being associated with one TRP and one UE.

Aspect 21 is the apparatus of any of aspects 1 to 20, where the network entity is associated with an ML module, and the at least one processor is further configured to: train the ML module to map multiple directional features captured from multiple swept beam pairs to one location, the multiple swept beam pairs being associated with one TRP and one UE.

Aspect 22 is the apparatus of any of aspects 1 to 21, where the network entity is associated with an ML module, and the at least one processor is further configured to: train the ML module to map multiple directional features captured from multiple beam pairs to one location, the multiple beam pairs being associated with one UE and multiple TRPs.

Aspect 23 is the apparatus of any of aspects 1 to 22, where the network entity is associated with an ML module, and the at least one processor is further configured to: train the ML module to map multiple directional features captured from multiple swept beam pairs to one location, the multiple swept beam pairs being associated with one UE and multiple TRPs.

Aspect 24 is a method of wireless communication for implementing any of aspects 1 to 23.

Aspect 25 is an apparatus for wireless communication including means for implementing any of aspects 1 to 23.

Aspect 26 is a computer-readable medium storing computer executable code, where the code when executed by a processor causes the processor to implement any of aspects 1 to 23.

What is claimed is:

1. An apparatus for wireless communication at a network entity, comprising:
a memory;
at least one transceiver; and
at least one processor communicatively connected to the memory and the at least one transceiver, the at least one processor configured to:
receive, from one or more wireless devices, a plurality of first radio frequency (RF) fingerprints, each of the plurality of first RF fingerprints being associated with at least one directional feature and a location;
receive a request to determine a position of a user equipment (UE) based on at least one second RF fingerprint associated with the UE or captured by the UE; and
estimate the position of the UE based at least in part on matching the at least one second RF fingerprint to at least one of the plurality of first RF fingerprints;
wherein the network entity is a location server, the UE, or a base station associated with a machine learning (ML) module;
wherein the at least one processor is further configured to:
train the ML module based on each of the plurality of first RF fingerprints and the associated at least one directional feature and the associated location to create a mapping between each of the plurality of first RF fingerprints and the associated at least one directional feature and the associated location, wherein the position of the UE is estimated based on the mapping between the at least one second RF fingerprint and the associated at least one directional feature and the associated location.

2. The apparatus of claim 1, wherein the ML module is associated with a neural network (NN), a deep NN, or a random forest algorithm.

3. The apparatus of claim 1, wherein the request is received from the UE, a location server, or a base station.

4. The apparatus of claim 1, wherein the at least one directional feature corresponds to a channel impulse response (CIR) or a channel frequency response (CFR) captured from a positioning reference signal (PRS) or a sounding reference signal (SRS).

5. The apparatus of claim 1, wherein the at least one directional feature corresponds to a channel impulse response (CIR) or a channel frequency response (CFR) captured at multiple antenna pairs, each of the multiple antenna pairs including a transmission antenna of a transmitting device and a reception antenna of a receiving device.

6. The apparatus of claim 1, wherein the at least one directional feature corresponds to at least one of a normalized histogram of received signal strength measured over a period of time or a range of frequency captured at multiple antenna pairs, each of the multiple antenna pairs including a transmission antenna of a transmitting device and a reception antenna of a receiving device.

7. The apparatus of claim 1, wherein the at least one directional feature corresponds to a complex-sum of channel impulse response (CIR) or channel frequency response (CFR) captured at multiple antenna pairs or multiple beam pairs, each of the multiple antenna pairs including a transmission antenna of a transmitting device and a reception antenna of a receiving device and each of the multiple beam pairs including a transmission beam of the transmitting device and a reception beam of the receiving device.

8. The apparatus of claim 1, wherein the at least one directional feature corresponds to at least one of a normalized histogram of received signal strength measured over a period of time or a range of frequency captured at multiple antenna pairs and multiple beam pairs, each of the multiple antenna pairs including a transmission antenna of a transmitting device and a reception antenna of a receiving device and each of the multiple beam pairs including a transmission beam of the transmitting device and a reception beam of the receiving device.

9. The apparatus of claim 1, wherein the at least one directional feature corresponds to a compressed channel impulse response (CIR) or a compressed channel frequency response (CFR) captured at multiple antenna pairs or multiple beam pairs, each of the multiple antenna pairs including a transmission antenna of a transmitting device and a reception antenna of a receiving device and each of the multiple beam pairs including a transmission beam of the transmitting device and a reception beam of the receiving device.

10. The apparatus of claim 1, wherein the at least one directional feature corresponds to at least one of a compressed normalized histogram of received signal strength measured over a period of time or a range of frequency captured at multiple antenna pairs and multiple beam pairs, each of the multiple antenna pairs including a transmission antenna of a transmitting device and a reception antenna of a receiving device and each of the multiple beam pairs including a transmission beam of the transmitting device and a reception beam of the receiving device.

11. The apparatus of claim 1, wherein the at least one directional feature corresponds to one or more strongest channel impulse responses (CIRs) or one or more strongest channel frequency response (CFRs) captured at multiple antenna pairs or multiple beam pairs, each of the multiple antenna pairs including a transmission antenna of a transmitting device and a reception antenna of a receiving device and each of the multiple beam pairs including a transmission beam of the transmitting device and a reception beam of the receiving device.

12. The apparatus of claim 1, wherein the at least one directional feature corresponds to at least one of one or more strongest normalized histograms of received signal strength measured over a period of time or a range of frequency captured at multiple antenna pairs, each of the multiple antenna pairs including a transmission antenna of a transmitting device and a reception antenna of a receiving device.

13. The apparatus of claim 1, wherein each of the plurality of first RF fingerprints is further associated with at least one beam feature, and wherein the position of the UE is estimated further based at least in part on the at least one beam feature.

14. The apparatus of claim 13, wherein the at least one beam feature includes one or more of: a beam shape, a cumulative distribution function (CDF) or a probability density function (PDF) of beam-based spherical effective isotropic radiated power (EIRP) measurements, a beam configuration, a beam measurement, or a beam embedding based on a graph convolutional network (GCN).

15. The apparatus of claim 13, wherein the at least one beam feature is associated with at least one of a transmission beam at a transmitting device or a reception beam at a receiving device.

16. The apparatus of claim 1, wherein the at least one second RF fingerprint associated with the UE is based on one beam pair between one beam of the UE and one beam of a transmission reception point (TRP).

17. The apparatus of claim 1, wherein the at least one second RF fingerprint associated with the UE is based on a beam sweeping between one or more beams of the UE and one or more beams of a transmission reception point (TRP).

18. The apparatus of claim 1, wherein the network entity is associated with a machine learning (ML) module, and the at least one processor is further configured to:
    train the ML module to map one directional feature captured from one antenna pair to one location, the one antenna pair being associated with one transmission reception point (TRP) and one UE.

19. The apparatus of claim 1, wherein the network entity is associated with a machine learning (ML) module, and the at least one processor is further configured to:
    train the ML module to map multiple directional features captured from multiple swept beam pairs to one location, the multiple swept beam pairs being associated with one transmission reception point (TRP) and one UE.

20. The apparatus of claim 1, wherein the network entity is associated with a machine learning (ML) module, and the at least one processor is further configured to:
    train the ML module to map multiple directional features captured from multiple beam pairs to one location, the multiple beam pairs being associated with one UE and multiple transmission reception points (TRPs).

21. The apparatus of claim 1, wherein the network entity is associated with a machine learning (ML) module, and the at least one processor is further configured to:
    train the ML module to map multiple directional features captured from multiple swept beam pairs to one location, the multiple swept beam pairs being associated with one UE and multiple transmission reception points (TRPs).

22. A method of wireless communication at a network entity, comprising:
    receiving, from one or more wireless devices, a plurality of first radio frequency (RF) fingerprints, each of the plurality of first RF fingerprints being associated with at least one directional feature and a location;
    receiving a request to determine a position of a user equipment (UE) based on at least one second RF fingerprint associated with the UE or captured by the UE; and
    estimating the position of the UE based at least in part on matching the at least one second RF fingerprint to at least one of the plurality of first RF fingerprints;
    wherein the network entity is a location server, the UE, or a base station associated with a machine learning (ML) module, and
    the method further comprising:
    training the ML module based on each of the plurality of first RF fingerprints and the associated at least one directional feature and the associated location to create a mapping between each of the plurality of first RF fingerprints and the associated at least one directional feature and the associated location, wherein the position of the UE is estimated based on the mapping between the at least one second RF fingerprint and the associated at least one directional feature and the associated location.

23. The method of claim 22, wherein the ML module is associated with a neural network (NN), a deep NN, or a random forest algorithm.

24. The method of claim 22, wherein each of the plurality of first RF fingerprints is further associated with at least one beam feature, and wherein the position of the UE is estimated further based at least in part on the at least one beam feature, and wherein the at least one beam feature includes one or more of: a beam shape, a cumulative distribution function (CDF) or a probability density function (PDF) of beam-based spherical effective isotropic radiated power (EIRP) measurements, a beam configuration, a beam measurement, or a beam embedding based on a graph convolutional network (GCN).

25. The method of claim 22, wherein the at least one second RF fingerprint associated with the UE is based on one beam pair between one beam of the UE and one beam of a transmission reception point (TRP) or based on a beam sweeping between one or more beams of the UE and one or more beams of the TRP.

26. An apparatus for wireless communication at a network entity, comprising:
    means for receiving, from one or more wireless devices, a plurality of first radio frequency (RF) fingerprints, each of the plurality of first RF fingerprints being associated with at least one directional feature and a location;
    means for receiving a request to determine a position of a user equipment (UE) based on at least one second RF fingerprint associated with the UE or captured by the UE; and
    means for estimating the position of the UE based at least in part on matching the at least one second RF fingerprint to at least one of the plurality of first RF fingerprints;
    wherein the network entity is a location server, the UE, or a base station associated with a machine learning (ML) module, and
    the apparatus further comprising:
    means for training the ML module based on each of the plurality of first RF fingerprints and the associated at least one directional feature and the associated location to create a mapping between each of the plurality of first RF fingerprints and the associated at least one directional feature and the associated location, wherein the position of the UE is estimated based on the mapping between the at least one second RF fingerprint and the associated at least one directional feature and the associated location.

27. A non-transitory computer-readable medium storing computer executable code at a network entity, the code when executed by a processor causes the processor to:
receive, from one or more wireless devices, a plurality of first radio frequency (RF) fingerprints, each of the plurality of first RF fingerprints being associated with at least one directional feature and a location;
receive a request to determine a position of a user equipment (UE) based on at least one second RF fingerprint associated with the UE or captured by the UE; and
estimate the position of the UE based at least in part on matching the at least one second RF fingerprint to at least one of the plurality of first RF fingerprints;
wherein the network entity is a location server, the UE, or a base station associated with a machine learning (ML) module, and
the code when executed by the processor further causes the processor to:
train the ML module based on each of the plurality of first RF fingerprints and the associated at least one directional feature and the associated location to create a mapping between each of the plurality of first RF fingerprints and the associated at least one directional feature and the associated location, wherein the position of the UE is estimated based on the mapping between the at least one second RF fingerprint and the associated at least one directional feature and the associated location.

* * * * *